(12) United States Patent
Noda

(10) Patent No.: US 11,650,396 B2
(45) Date of Patent: *May 16, 2023

(54) ZOOM LENS AND IMAGING APPARATUS

(71) Applicant: FUJIFILM Corporation, Tokyo (JP)

(72) Inventor: Taiga Noda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 316 days.

This patent is subject to a terminal disclaimer.

(21) Appl. No.: 17/061,884

(22) Filed: Oct. 2, 2020

(65) Prior Publication Data

US 2021/0018722 A1 Jan. 21, 2021

Related U.S. Application Data

(62) Division of application No. 16/220,230, filed on Dec. 14, 2018, now Pat. No. 10,830,993.

(30) Foreign Application Priority Data

Dec. 20, 2017 (JP) ................................ 2017-244502

(51) Int. Cl.
*G02B 15/14* (2006.01)
*G02B 9/62* (2006.01)
(Continued)

(52) U.S. Cl.
CPC ........... *G02B 9/62* (2013.01); *G02B 15/1461* (2019.08); *G02B 27/0025* (2013.01);
(Continued)

(58) Field of Classification Search
CPC .... G02B 9/62; G02B 27/0025; G02B 15/173; G02B 15/20; G02B 27/646; G02B 5/005;
(Continued)

(56) References Cited

U.S. PATENT DOCUMENTS 7,336,425 B2 * 2/2008 Obama .......... G02B 15/145129
359/683
7,848,028 B2 * 12/2010 Ohtake .............. G02B 15/1461
359/683

(Continued)

FOREIGN PATENT DOCUMENTS

CN 103901588 A 7/2014
CN 106814443 A 6/2017
(Continued)

OTHER PUBLICATIONS

An Office Action mailed by China National Intellectual Property Administration dated Nov. 3, 2021 which corresponds to Chinese Patent Application No. 201811553132.1 and is related to U.S. Appl. No. 17/061,884 with English language translation.

(Continued)

*Primary Examiner* — Evelyn A Lester
(74) *Attorney, Agent, or Firm* — Studebaker & Brackett PC

(57) ABSTRACT

The zoom lens includes a positive first lens group, a negative second lens group, a positive third lens group, a negative fourth lens group, a negative fifth lens group, and a positive sixth lens group in order from an object side. All distances between adjacent lens groups change during zooming. The first lens group consists of a negative lens, a positive lens, and a positive lens in order from the object side. Only the fourth lens group moves to an image side during focusing from a long range to a short range. Conditional Expression related to a distance from a lens surface of the first lens group closest to the object side to an image plane and a distance from a lens surface of the second lens group closest to the object side to the image plane is satisfied.

18 Claims, 17 Drawing Sheets

EXAMPLE 1

(51) Int. Cl.
| | |
|---|---|
| *G02B 27/09* | (2006.01) |
| *G02B 27/00* | (2006.01) |
| G02B 15/22 | (2006.01) |
| G02B 13/00 | (2006.01) |
| G02B 5/00 | (2006.01) |
| G02B 15/20 | (2006.01) |
| G02B 27/64 | (2006.01) |
| G02B 15/15 | (2006.01) |
| G02B 15/173 | (2006.01) |
| G02B 13/06 | (2006.01) |

(52) U.S. Cl.
CPC .......... *G02B 27/0955* (2013.01); *G02B 5/005* (2013.01); *G02B 13/002* (2013.01); *G02B 13/009* (2013.01); *G02B 13/06* (2013.01); *G02B 15/14* (2013.01); *G02B 15/146* (2019.08); *G02B 15/15* (2013.01); *G02B 15/173* (2013.01); *G02B 15/20* (2013.01); *G02B 15/22* (2013.01); *G02B 27/646* (2013.01)

(58) Field of Classification Search
CPC ...... G02B 13/009; G02B 13/06; G02B 15/14; G02B 13/002; G02B 15/15; G02B 15/22; G02B 15/146
USPC .......................... 359/683–686, 713, 740, 757
See application file for complete search history.

(56) References Cited

U.S. PATENT DOCUMENTS

| | | | | |
|---|---|---|---|---|
| 8,503,095 | B2* | 8/2013 | Kimura | G02B 15/145121 359/683 |
| 8,760,771 | B2* | 6/2014 | Sugita | G02B 15/145521 359/683 |
| 8,797,655 | B2* | 8/2014 | Sugita | G02B 15/145527 359/683 |
| 8,953,251 | B2* | 2/2015 | Okada | G02B 13/12 359/686 |
| 9,285,571 | B2* | 3/2016 | Iwasawa | G02B 9/62 |
| 9,329,370 | B2* | 5/2016 | Iwasawa | H04N 5/23296 |
| 9,477,069 | B2* | 10/2016 | Iwasawa | G02B 15/1461 |
| 9,904,042 | B2* | 2/2018 | Bito | G02B 15/1461 |
| 10,353,171 | B2* | 7/2019 | Hatada | G02B 9/64 |
| 10,634,876 | B2* | 4/2020 | Hatada | G02B 9/62 |
| 10,670,832 | B2* | 6/2020 | Mori | G02B 9/60 |
| 10,976,530 | B2* | 4/2021 | Iwasawa | G02B 27/0025 |
| 11,454,789 | B2* | 9/2022 | Noda | G02B 15/1451 |
| 2009/0147375 | A1* | 6/2009 | Sudoh | G02B 15/1461 359/683 |
| 2010/0033836 | A1* | 2/2010 | Ohtake | G02B 15/1461 359/683 |
| 2010/0284092 | A1* | 11/2010 | Hayakawa | G02B 15/145121 359/683 |
| 2012/0050603 | A1* | 3/2012 | Imaoka | G02B 15/1461 359/683 |
| 2012/0262797 | A1* | 10/2012 | Sugita | G02B 15/177 359/683 |
| 2013/0088786 | A1* | 4/2013 | Sugita | G02B 15/145527 359/684 |
| 2013/0148005 | A1* | 6/2013 | Imaoka | G02B 15/145121 359/557 |
| 2013/0342716 | A1 | 12/2013 | Yamamoto et al. | |
| 2014/0347522 | A1* | 11/2014 | Iwasawa | G02B 15/1461 359/684 |
| 2015/0138401 | A1 | 5/2015 | Fujisaki | |
| 2015/0177498 | A1* | 6/2015 | Iwasawa | G02B 15/145105 359/684 |
| 2015/0237242 | A1* | 8/2015 | Imaoka | G02B 27/646 359/683 |
| 2015/0338620 | A1* | 11/2015 | Iwasawa | G02B 15/1461 359/683 |
| 2016/0062091 | A1* | 3/2016 | Wada | G02B 15/145121 359/683 |
| 2016/0116722 | A1* | 4/2016 | Bito | H04N 5/23296 359/683 |
| 2016/0154217 | A1 | 6/2016 | Fujisaki | |
| 2016/0161725 | A1* | 6/2016 | Shimomura | G02B 15/142 359/557 |
| 2016/0202453 | A1* | 7/2016 | Iwasawa | G02B 15/173 359/683 |
| 2016/0202458 | A1* | 7/2016 | Bito | H04N 5/2628 359/684 |
| 2017/0052344 | A1 | 2/2017 | Obikane | |
| 2017/0090169 | A1 | 3/2017 | Noda | |
| 2017/0090170 | A1 | 3/2017 | Noda | |
| 2017/0139189 | A1 | 5/2017 | Iwasawa et al. | |
| 2017/0261728 | A1 | 9/2017 | Shibata et al. | |
| 2017/0293124 | A1 | 10/2017 | Kawamura | |
| 2018/0252895 | A1* | 9/2018 | Hatada | G02B 9/64 |
| 2018/0284407 | A1 | 10/2018 | Iwasawa et al. | |
| 2018/0307012 | A1 | 10/2018 | Machida et al. | |
| 2018/0348478 | A1* | 12/2018 | Mori | G02B 7/10 |
| 2019/0187409 | A1* | 6/2019 | Noda | G02B 13/06 |
| 2019/0271829 | A1* | 9/2019 | Hatada | G02B 9/64 |
| 2021/0018723 | A1* | 1/2021 | Noda | G02B 13/06 |
| 2021/0318518 | A1* | 10/2021 | Noda | G02B 27/0025 |
| 2021/0364768 | A1* | 11/2021 | Nagami | G02B 15/1461 |

FOREIGN PATENT DOCUMENTS

| | | |
|---|---|---|
| CN | 106814444 A | 6/2017 |
| CN | 107272169 A | 10/2017 |
| JP | 2008-015251 A | 1/2008 |
| JP | 2016-038502 A | 3/2016 |
| JP | 2017-134302 A | 8/2017 |
| JP | 6189637 B2 | 8/2017 |
| JP | 2017-187639 A | 10/2017 |
| JP | 2018-205475 A | 12/2018 |
| WO | 2016/194774 A1 | 12/2016 |

OTHER PUBLICATIONS

An Office Action; "Notice of Reasons for Refusal," mailed by the Japanese Patent Office dated Nov. 17, 2020, which corresponds to Japanese Patent Application No. 2017-244502 and is related to U.S. Appl. No. 17/061,884 ; with English language translation.

* cited by examiner

EXAMPLE 1

EXAMPLE 4

EXAMPLE 5

EXAMPLE 1 (OBJECT AT INFINITY)

EXAMPLE 1 (OBJECT AT FINITE DISTANCE)

EXAMPLE 2 (OBJECT AT FINITE DISTANCE)

EXAMPLE 3 (OBJECT AT INFINITY)

EXAMPLE 3 (OBJECT AT FINITE DISTANCE)

EXAMPLE 4 (OBJECT AT FINITE DISTANCE)

EXAMPLE 5 (OBJECT AT INFINITY)

ZOOM LENS AND IMAGING APPARATUS

CROSS-REFERENCE TO RELATED APPLICATIONS

The present application is a Divisional of U.S. patent application Ser. No. 16/220,230 filed on Dec. 14, 2018, which claims priority under 35 U.S.C. § 119 to Japanese Patent Application No. 2017-244502, filed on Dec. 20, 2017. The above application is hereby expressly incorporated by reference, in its entirety, into the present application.

BACKGROUND OF THE INVENTION

1. Field of the Invention

The present invention relates to a zoom lens and an imaging apparatus.

2. Description of the Related Art

In the related art, in an interchangeable lens to be used in a digital camera, there is a need for a so-called zoom lens with a high zoom ratio capable of performing imaging by using one lens without interchanging the lens from a wide angle region to a telephoto region. For example, JP2017-134302A and JP6189637B describe a zoom lens that takes cognizance of a high zoom ratio available for a digital camera.

SUMMARY OF THE INVENTION

Since such a zoom lens with a high zoom ratio which does not require the interchange of a lens is useful in a situation in which a user does not want to carry a plurality of lenses, that is, a situation in which the user does not want to increase their luggage, there is a need for a small zoom lens. In recent years, the number of imaging pixels of the imaging element used by being combined with the zoom lens increases, and advanced aberration correction is required in the zoom lens.

However, the zoom lens described in JP2017-134302A has a problem that it is difficult to compose a small lens system since the total length of the lens at the wide-angle end is long and the lens diameter of the first lens group closest to the object side is large even though conversion is performed by using the size of the imaging element as a reference. The zoom lens described in JP6189637B has a problem that it is difficult to compose a small lens system since the total length of the lens at the wide-angle end and the total length of the lens at the telephoto end are long even though the conversion is performed by using the size of the imaging element as a reference.

In view of such circumstances, an object of the present invention is to provide a zoom lens which achieves reduction in size and has high optical performance obtained by satisfactorily correcting various aberrations while securing a high zoom ratio, and an imaging apparatus comprising the zoom lens.

In order to solve the problems, a zoom lens according to the present invention comprises only six lens groups, as lens groups, which consist of a first lens group having a positive refractive power, a second lens group having a negative refractive power, a third lens group having a positive refractive power, a fourth lens group having a negative refractive power, a fifth lens group having a negative refractive power, and a sixth lens group having a positive refractive power, in order from an object side to an image side. All distances between adjacent lens groups in an optical axis direction change during zooming, a stop is disposed between a lens surface of the second lens group closest to the image side and a lens surface of the fourth lens group closest to the image side, the first lens group consists of a negative lens, a positive lens, and a positive lens in order from the object side to the image side, a lens group moving during focusing is only the fourth lens group, and the fourth lens group moves to the image side during focusing from an object with a long range to an object with a short range, and assuming that a distance on an optical axis from a lens surface of the first lens group closest to the object side to an image plane at a telephoto end is XT1, a distance on the optical axis from a lens surface of the first lens group closest to the object side to the image plane at a wide-angle end is XW1, a distance on the optical axis from a lens surface of the second lens group closest to the object side to the image plane at the telephoto end is XT2, and a distance on the optical axis from a lens surface of the second lens group closest to the object side to the image plane at the wide-angle end is XW2, Conditional Expression (1) is satisfied.

$$2.9 < (XT1-XW1)/(XT2-XW2) < 5.3 \tag{1}$$

In the zoom lens according to the present invention, it is preferable that Conditional Expression (1-1) is satisfied.

$$3.3 < (XT1-XW1)/(XT2-XW2) < 4.8 \tag{1-1}$$

In the zoom lens according to the present invention, it is preferable that all the six lens groups move in an optical axis direction during zooming.

In the zoom lens according to the present invention, assuming that a distance on the optical axis between a lens surface of the fifth lens group closest to the image side and a lens surface of the sixth lens group closest to the object side at the wide-angle end is D56W and a distance on the optical axis between a lens surface of the fifth lens group closest to the image side and a lens surface of the sixth lens group closest to the object side at the telephoto end is D56T, it is preferable that Conditional Expression (2) is satisfied, and it is more preferable that Conditional Expression (2-1) is satisfied.

$$0.03 < D56W/D56T < 0.2 \tag{2}$$

$$0.05 < D56W/D56T < 0.15 \tag{2-1}$$

In the zoom lens according to the present invention, assuming that a distance on the optical axis between a lens surface of the fourth lens group closest to the image side and a lens surface of the fifth lens group closest to the object side at the wide-angle end is D45W and a distance on the optical axis between a lens surface of the fourth lens group closest to the image side and a lens surface of the fifth lens group closest to the object side at the telephoto end is D45T, it is preferable that Conditional Expression (3) is satisfied, and it is more preferable that Conditional Expression (3-1) is satisfied.

$$0.11 < D45W/D45T < 0.4 \tag{3}$$

$$0.16 < D45W/D45T < 0.35 \tag{3-1}$$

In the zoom lens according to the present invention, assuming that a lens of the third lens group closest to the image side is a positive lens, a focal length of the positive lens of the third lens group closest to the image side is f3r, and a focal length of the third lens group is f3, it is preferable that Conditional Expression (4) is satisfied, and it is preferable that Conditional Expression (4-1) is satisfied.

$$0.16 < f3r/f3 < 0.4 \quad (4)$$

$$0.2 < f3r/f3 < 0.36 \quad (4\text{-}1)$$

In the zoom lens according to the present invention, assuming that a distance on the optical axis between a lens surface of the third lens group closest to the image side and a lens surface of the fourth lens group closest to the object side at the wide-angle end is D34W and a distance on the optical axis between a lens surface of the third lens group closest to the image side and a lens surface of the fourth lens group closest to the object side at the telephoto end is D34T, it is preferable that Conditional Expression (5) is satisfied, and it is more preferable that Conditional Expression (5-1) is satisfied.

$$0.2 < D34W/D34T < 1.2 \quad (5)$$

$$0.3 < D34W/D34T < 1 \quad (5\text{-}1)$$

In the zoom lens according to the present invention, assuming that a lens of the third lens group closest to the object side is a positive lens and an Abbe number of the positive lens of the third lens group closest to the object side at a d line is ν3f, it is preferable that Conditional Expression (6) is satisfied, and it is more preferable that Conditional Expression (6-1) is satisfied.

$$25 < \nu 3f < 49 \quad (6)$$

$$28 < \nu 3f < 45 \quad (6\text{-}1)$$

In the zoom lens according to the present invention, it is preferable that a lens of the third lens group closest to the image side is a positive lens and image shake correction is performed by moving the positive lens of the third lens group closest to the image side in a direction crossing an optical axis.

In the zoom lens according to the present invention, it is preferable that all lens surfaces of the sixth lens group have shapes convex toward the image side.

In the zoom lens according to the present invention, it is preferable that the third lens group consists of a single lens having a positive refractive power, a single lens having a positive refractive power, a cemented lens obtained by cementing a negative lens and a positive lens in order from the object side, and a single lens having a positive refractive power in order from the object side to the image side.

In the zoom lens according to the present invention, it is preferable that the fourth lens group consists of a cemented lens obtained by cementing a positive lens and a negative lens in order from the object side.

In the zoom lens according to the present invention, it is preferable that the fifth lens group consists of a single lens having a negative refractive power.

In the zoom lens according to the present invention, it is preferable that the sixth lens group consists of a single lens having a positive refractive power.

An imaging apparatus according to the present embodiment comprises the zoom lens according to the present invention.

In the present description, it should be noted that the terms "consisting of ~" and "consists of ~" mean that the imaging lens may include not only the above-mentioned elements but also lenses substantially having no refractive powers, optical elements, which are not lenses, such as a stop, a filter, and a cover glass, and mechanism parts such as a lens flange, a lens barrel, an imaging element, and a camera shake correction mechanism in addition to the illustrated constituent elements.

In the present description, the term "~ group that has a positive refractive power" means that the group has a positive refractive power as a whole. Likewise, the term "~ group that has a negative refractive power" means that the group has a negative refractive power as a whole. The "lens having a positive refractive power" and the "positive lens" are synonymous. The "lens having a negative refractive power" and the "negative lens" are synonymous. The "lens group" is not to limit to a configuration consisting of a plurality of lenses, and may consist of only one lens. The "single lens" means one lens which is not cemented. Here, a complex aspherical lens (a lens functions as one aspherical lens as a whole by integrally forming a spherical lens and an aspherical film formed on the spherical lens) is not regarded as a cemented lens, and is treated as one lens. It is assumed that a reference sign of a refractive power related to a lens including an aspherical surface and a surface shape of a lens surface are considered in paraxial region unless otherwise noted. The "focal length" used in Conditional Expressions is a paraxial focal length. Values in Conditional Expressions are values in a case where the d line (a wavelength of 587.6 nanometers (nm)) is used as a reference in a state in which the object at infinity is in focus.

According to the present invention, it is possible to provide a zoom lens which achieves reduction in size and has high optical performance obtained by satisfactorily correcting various aberrations while securing a high zoom ratio, and an imaging apparatus comprising the zoom lens.

DESCRIPTION OF THE PREFERRED EMBODIMENTS

Figure 1:
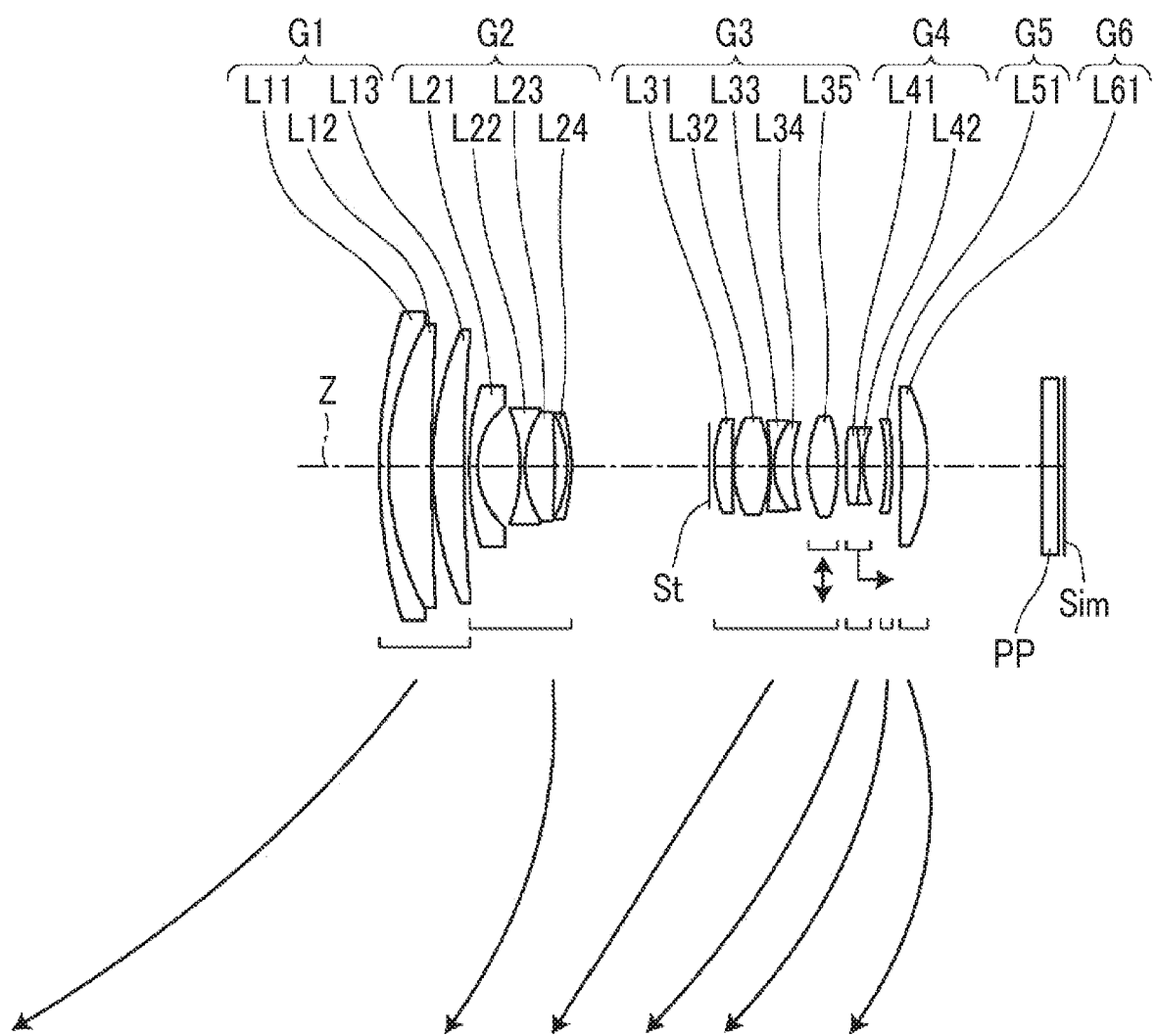
FIG. 1 is a cross-sectional view illustrating a lens configuration and a movement locus of a zoom lens (a zoom lens according to Example 1) according to an embodiment of the present invention at a wide-angle end.
Figure 2:
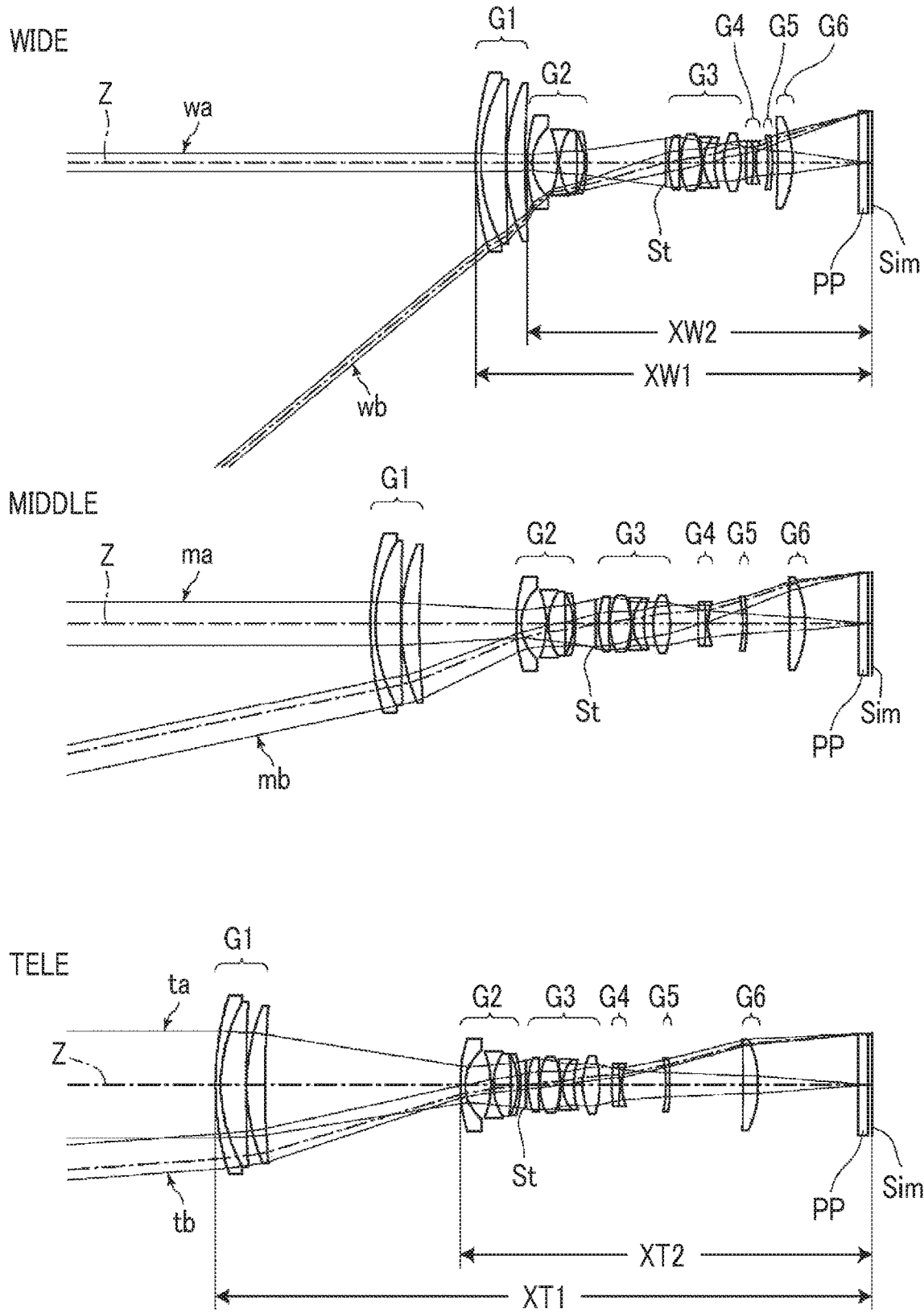
FIG. 2 is a cross-sectional view illustrating a configuration and optical paths of the zoom lens according to Example 1 of the present invention at a wide-angle end, a middle focal length state, and a telephoto end.

Hereinafter, embodiments of the present invention will be described with reference to drawings. FIG. 1 is a cross-sectional view illustrating a lens configuration of a zoom lens of an embodiment of the present invention at the wide-angle end. FIG. 2 is a cross-sectional view additionally illustrating optical paths of the zoom lens in the respective states. The examples shown in FIGS. 1 and 2 correspond to the zoom lens of Example 1 to be described later. FIGS. 1 and 2 each show a state where the object at infinity is in focus, where the left side of the drawing is the object side and the right side of the drawing is the image side. In FIG. 2, the upper part labeled by "WIDE" shows the wide-angle end state, the middle part labeled by "MIDDLE" shows the middle focal length state, and the lower part labeled by "TELE" shows the telephoto end state. FIG. 2 shows rays including on-axis rays wa and rays with the maximum angle of view wb at the wide-angle end state, on-axis rays ma and rays with the maximum angle of view mb at the middle focal length state, and on-axis rays to and rays with the maximum angle of view tb at the telephoto end state. Hereinafter, the description will be primarily made with reference to FIG. 1.

In FIG. 1, it is assumed that the zoom lens is applied to the imaging apparatus, and an example in which an optical member PP having an incident surface and an exit surface parallel to each other is disposed between the zoom lens and the image plane Sim is illustrated. The optical member PP is a member assumed to include various filters and/or a cover glass. The various filters are, for example, a low-pass filter, an infrared cut filter, and a filter for cutting a specific wavelength range. The optical member PP is a member having no refractive power, and may be omitted.

The zoom lens of the present embodiment comprises only six lens groups, as lens groups, which consist of a first lens group G1 having a positive refractive power, a second lens group G2 having a negative refractive power, a third lens group G3 having a positive refractive power, a fourth lens group G4 having a negative refractive power, a fifth lens group G5 having a negative refractive power, and a sixth lens group G6 having a positive refractive power in order from the object side to the image side along the optical axis Z. All distances between the adjacent lens groups in the optical axis direction change during zooming from the wide-angle end to the telephoto end. In such a configuration, there is an advantage in shortening the total length of the lens. More specifically, in such a configuration, it is possible to reduce the movement amount of the lens groups during zooming, and it is possible to shorten the total length of the lens. There is an advantage in achieving a high zoom ratio while securing telecentric properties. Particularly, in a case where the zoom lens according to the present embodiment is applied to a mirrorless camera having short backfocus, these advantages are more remarkable.

It is preferable that all the six lens groups move in the optical axis direction during zooming from the wide-angle end to the telephoto end. In such a case, it is possible to suppress the movement amount of the lens groups from being too large by distributing the zooming function of each lens group, and there is an advantage in reduction in size. In the example of FIG. 1, all the lens groups move in the optical axis direction with different loci during zooming from the wide-angle end to the telephoto end. In FIG. 1, a schematic movement locus of each lens group during zooming from the wide-angle end to the telephoto end is indicated by a curved arrow under each lens group.

In the zoom lens according to the present embodiment, an aperture stop St is disposed between a lens surface of the second lens group G2 closest to the image side and a lens surface of the fourth lens group G4 closest to the image side. There is an advantage in reducing the diameter of the lens by disposing the aperture stop St in this manner. More specifically, it is preferable that the aperture stop St is disposed between the lens surface of the second lens group G2 closest to the image side and a lens surface of the third lens group G3 closest to the object side, as shown in the example of FIG. 1. In such a case, since the aperture stop St is located between the lens group and the lens group, there is an advantage in securing the distance between the lens groups and the distance between the aperture stop St and the lens group, and there is an advantage in reducing the diameter of the lens closest to the object side.

The lens group moving during focusing (hereinafter, referred to as a focus group) is only the fourth lens group G4, and the fourth lens group G4 is configured to move toward the image side during focusing from an object with a long range to an object with a short range. An arrow pointing an image-side direction under the fourth lens group G4 of FIG. 1 means that the fourth lens group G4 moves toward the image side during focusing from the object at infinity to the object with a short range. Since the fourth lens group G4 is the lens group immediately behind the lens surface of the third lens group G3 having the positive refractive power which is closest to the image side, it is possible to reduce the size of the lens in the diameter direction, and it is easy to reduce the weight of the lens. Accordingly, there is an advantage for high-speed focusing. It is easy to reduce fluctuation in aberration and fluctuation in angle of view during focusing by using the fourth lens group G4 as the focus group.

The first lens group G1 has the positive refractive power as a whole. The lens group closest to the object side is the positive lens group, and thus, there is an advantage in shortening the total length of the lens. Accordingly, it is easy to reduce the size of the lens. The first lens group G1 consists of three lenses composed of a negative lens, a positive lens, and a positive lens in order from the object side to the image side. It is possible to correct longitudinal chromatic aberration, lateral chromatic aberration, and spherical aberration by using the negative lens closest to the object side. The first lens group G1 has the two positive lenses, and thus, it is possible to secure the positive refractive power of the first lens group G1 while suppressing the occurrence of the spherical aberration. Accordingly, it is possible to shorten the total length of the lens. In the example of FIG. 1, the first lens group G1 consists of three lenses such as a negative lens L11, a positive lens L12, and a positive lens L13 in order from the object side to the image side.

The second lens group G2 has the negative refractive power as a whole. The second lens group G2 is the negative lens group, and thus, the second lens group G2 can have a main function of zooming. In the example of FIG. 1, the second lens group G2 consists of four lenses such as a negative lens L21, a negative lens L22, a positive lens L23, and a negative lens L24 in order from the object side to the image side.

The third lens group G3 has the positive refractive power as a whole. The third lens group G3 is the positive lens group, and thus, the third lens group G3 can have a main positive refractive function of the entire system. In the example of FIG. 1, the third lens group G3 consists of five lenses such as a positive lens L31, a positive lens L32, a negative lens L33, a positive lens L34, and a positive lens L35 in order from the object side to the image side.

It is preferable that the lens of the third lens group G3 closest to the object side is the positive lens. In such a case, divergent rays from the second lens group G2 are received by the positive lens of the third lens group G3 closest to the object side, and thus, it is possible to restrain the diameter of the lens closer to the image side from being further enlarged than the diameter of this positive lens. There is an advantage in suppressing the occurrence of the spherical aberration.

It is preferable that the lens of the third lens group G3 closest to the image side is the positive lens. In such a case, there is an advantage in reducing the lens diameter of the fourth lens group G4 which is the focus group.

In a case where the lens of the third lens group G3 closest to the image side is the positive lens, it is preferable that image shake correction is performed by moving the positive lens of the third lens group G3 closest to the image side in the direction crossing the optical axis Z. That is, it is preferable that the lens group moving during the image shake correction (hereinafter, referred to as an anti-vibration lens group) consists of the positive lens of the third lens group G3 closest to the image side. Assuming that an image forming zoom ratio of the anti-vibration lens group is βs and a combination image forming zoom ratio of the lens group closer to the image side than the anti-vibration lens group is βr, anti-vibration sensitivity is expressed by (1−βs)×βr. In the group configuration of the zoom lens according to the present embodiment, an image forming zoom ratio of the positive lens of the third lens group G3 closest to the image side tends to be negative and combination image forming zoom ratios of the fourth lens group G4 to the sixth lens group G6 tend to be positive. In this regard, in a case where the positive lens of the third lens group G3 closest to the image side is the anti-vibration lens group, the zoom lens is optimized for securing sensitivity related to anti-vibration, and it is possible to reduce the movement amount of the anti-vibration lens group during the image shake correction. Accordingly, it is possible to reduce the fluctuation in aberration during the image shake correction. In the example of FIG. 1, the lens L35 is the anti-vibration lens group, and an up-down arrow under the lens group L35 of FIG. 1 means that the lens L35 is the anti-vibration lens group.

It is preferable that the third lens group G3 consists of five lenses such as a single lens having a positive refractive power, a single lens having a positive refractive power, a cemented lens obtained by cementing the negative lens and the positive lens in order from the object side, and a single lens having a positive refractive power in order from the object side to the image side. In such a case, it is easy to reduce the diameter of the lens, and it is easy to suppress the occurrence of the spherical aberration and the longitudinal chromatic aberration.

Assuming that the third lens group G3 preferably consists of the five lenses, it is possible to acquire the following advantages more specifically. The divergent rays from the second lens group G2 are gently converted into convergent rays by these two positive lenses by using the first and second single lenses each having the positive refractive power which are included in the third lens group G3 from the object side, and thus, it is possible to suppress the occurrence of the spherical aberration while restraining the diameter of the lens closer to the image side than these two positive lenses from increasing. Due to the use of the cemented lens consisting of the third and fourth lenses of the third lens group G3 from the object side, it is possible to correct the longitudinal chromatic aberration, and it is possible to correct color blurring in the optical axis direction which is caused by the longitudinal chromatic aberration. Off-axis rays closer to the image side than the third lens group G3 are not able to be far away from the optical axis Z by using the positive lens of the third lens group G3 closest to the image side, and it is possible to reduce the lens diameter of the lens group closer to the image side than the third lens group G3.

The fourth lens group G4 has the negative refractive power as a whole. The fourth lens group G4 is the negative lens group, and thus, it is possible to correct fluctuation in astigmatism caused by the zooming.

It is preferable that the fourth lens group G4 consists of a cemented lens obtained by cementing a positive lens and a negative lens in order from the object side. In such a case, it is possible to suppress fluctuation in color blurring during the focusing which is caused by the lateral chromatic aberration and the longitudinal chromatic aberration. The fourth lens group G4 which is the focus group consists of the cemented lens, and thus, it is possible to simplify a frame of the focus group. Accordingly, there is an advantage in achieving high-speed focusing. In the example of FIG. 1, the fourth lens group G4 consists of two lenses including a positive lens L41 and a negative lens L42 in order from the object side to the image side, and these lenses are cemented.

The fifth lens group G5 has the negative refractive power as a whole. The fifth lens group G5 is the negative lens group, and thus, it is possible to correct the fluctuation in astigmatism caused by the zooming.

It is preferable that the fifth lens group G5 consists of a single lens having the negative refractive power. In a case where the number of lenses of the fifth lens group G5 increases, there is a concern that interference with a focusing drive system in the vicinity and a member around a mount will occur due to the complication of a frame and a cam mechanism, and the lens becomes bulky in the radial direction in a case where there is an attempt to avoid the interference. In view of such circumstances, it is preferable that the fifth lens group G5 consists of one lens. In the example of FIG. 1, the fifth lens group G5 consists of one lens such as a lens L51 which is a negative Meniscus lens convex toward the image side.

The sixth lens group G6 has the positive refractive power as a whole. The sixth lens group G6 is the positive lens group, and thus, it is possible to reduce an incidence angle of rays with a peripheral angle of view on the image plane Sim.

It is preferable that the sixth lens group G6 consists of a single lens having a positive refractive power. In a case where the number of lenses of the sixth lens group G6 increases and thus, a thickness increases, the refractive power of the second lens group G2 or a combined refractive power of the fourth lens group G4 and the fifth lens group G5 needs to be strengthened in order to maintain the backfocus, and the fluctuation in spherical aberration and the fluctuation in astigmatism may increase in a case where the refractive power is strengthened. In views of such circumstances, it is preferable that the sixth lens group G6 consists of one lens. In the example of FIG. 1, the sixth lens group G6 consists of one lens such as a lens L61 which is a positive Meniscus lens convex toward the image side.

It is preferable that all the lens surfaces of the sixth lens group G6 each have a shape convex toward the image side. In a case where the zoom lens is mounted on the imaging apparatus, the combination of the zoom lens and an imaging element disposed on the image plane Sim is generally used, and the sixth lens group G6 is the lens group closest to the imaging element in this case. In a case where the lens surface concave toward the image side is present as a surface close to the imaging element, since reflection rays from the member in the vicinity of the imaging element are returned to the imaging element again and are rendered to stray rays, there is an advantage in suppressing the stray rays by allowing all the lens surfaces of the sixth lens group G6 to be convex toward the image side. Particularly, it is possible to acquire a high advantage in a lens system having a short backfocus such as an imaging lens system mounted on the mirrorless camera.

In the zoom lens according to the present embodiment, assuming that a distance on an optical axis from a lens surface of the first lens group G1 closest to the object side to the image plane Sim at the telephoto end is XT1, a distance on the optical axis from a lens surface of the first lens group G1 closest to the object side to the image plane Sim at the wide-angle end is XW1, a distance on the optical axis from a lens surface of the second lens group G2 closest to the object side to the image plane Sim at the telephoto end is XT2, and a distance on the optical axis from a lens surface of the second lens group G2 closest to the object side to the image plane Sim at the wide-angle end is XW2, the following Conditional Expression (1) is satisfied. FIG. 2 shows, for example, XT1, XW1, XT2, and XW2.

$$2.9<(XT1-XW1)/(XT2-XW2)<5.3 \tag{1}$$

By not allowing the result of Conditional Expression (1) to be equal to or less than a lower limit, it is possible to reduce the movement amount of the second lens group G2 during zooming, and it is possible to suppress the maximization of the distance of the first lens group G1 from the aperture stop St at the telephoto end while securing a high zoom ratio. Accordingly, it is possible to suppress an increase in lens diameter of the first lens group G1. In a case where the movement amount of the second lens group G2 during zooming increases and there is an attempt to secure a high zoom ratio, the distance of the first lens group G1 from the aperture stop St at the telephoto end further increases, and thus, there is an inconvenience that the lens diameter of the first lens group G1 increases. Values corresponding to (XT1−XW1)/(XT2−XW2) are set to be negative by disposing the second lens group such that the position of the second lens group G2 at the telephoto end is closer to the image side than the position of the second lens group G2 at the wide-angle end, and thus, the aforementioned inconvenience may be solved. However, in such a case, since the position of the second lens G2 at the wide-angle end is far away from the aperture stop St, the total length of the lens at the wide-angle end becomes longer, and thus, there is another inconvenience that a length of a product during carrying increases.

By not allowing the result of Conditional Expression (1) to be equal to or greater than an upper limit, it is possible to suppress the extended amount of the first lens group G1 to the object side during zooming from the wide-angle end to the telephoto end, and it is possible to suppress an increase in diameter of the lens of the first lens group G1. The extended amount of the first lens group G1 is suppressed, and thus, it is possible to manufacture a product without using a long barrel or a multi-stage lens barrel. Accordingly, there is an advantage in reducing the size of the product.

In addition, in a case of a configuration in which Conditional Expression (1-1) is satisfied, it is possible to obtain more favorable characteristics.

$$3.3<(XT1-XW1)/(XT2-XW2)<4.8 \tag{1-1}$$

In the zoom lens according to the present embodiment, assuming that a distance on the optical axis between the lens surface of the fifth lens group G5 closest to the image side and the lens surface of the sixth lens group G6 closest to the object side at the wide-angle end is D56W and a distance on the optical axis between the lens surface of the fifth lens group G5 closest to the image side and the lens surface of the sixth lens group G6 closest to the object side at the telephoto end is D56T, it is preferable that the following Conditional Expression (2) is satisfied. By not allowing the result of Conditional Expression (2) to be equal to or less than a lower limit, since it is possible to suppress the height of the off-axis rays in the sixth lens group G6 at the telephoto end, it is possible to reduce the size of the sixth lens group G6. There is an advantage in securing a space around an electronic substrate in the vicinity of the mount. By not allowing the result of Conditional Expression (2) to be equal to or greater than an upper limit, it is possible to reduce the total length of the lens at the wide-angle end. In addition, in a case of a configuration in which Conditional Expression (2-1) is satisfied, it is possible to obtain more favorable characteristics.

$$0.03<D56W/D56T<0.2 \tag{2}$$

$$0.05<D56W/D56T<0.15 \tag{2-1}$$

In the zoom lens according to the present embodiment, assuming that a distance on the optical axis between the lens surface of the fourth lens group G4 closest to the image side and the lens surface of the fifth lens group G5 closest to the object side at the wide-angle end is D45W and a distance on the optical axis between the lens surface of the fourth lens group G4 closest to the image side and the lens surface of the fifth lens group G5 closest to the object side at the telephoto end is D45T, it is preferable that the following Conditional Expression (3) is satisfied. By not allowing the result of Conditional Expression (3) to be equal to or less than a lower limit, since it is possible to suppress the height of the off-axis rays in the fifth lens group G5 and the sixth lens group G6 at the telephoto end, it is possible to reduce the sizes of the fifth lens group G5 and the sixth lens group G6. There is an advantage in securing a space around an electronic substrate in the vicinity of the mount. By not allowing the result of Conditional Expression (3) to be equal to or greater than an upper limit, it is possible to reduce the total length of the lens at the wide-angle end. In addition, in a case of a configuration in which Conditional Expression (3-1) is satisfied, it is possible to obtain more favorable characteristics.

$$0.11 < D45W/D45T < 0.4 \quad (3)$$

$$0.16 < D45W/D45T < 0.35 \quad (3\text{-}1)$$

In the zoom lens according to the present embodiment, in a case where the lens of the third lens group G3 closest to the image side is the positive lens, the focal length of the positive lens of the third lens group G3 closest to the image side is f3r, and the focal length of the third lens group G3 is f3, it is preferable that the following Conditional Expression (4) is satisfied. By not allowing the result of Conditional Expression (4) to be equal to or less than a lower limit, it is possible to restrain the refractive power of the positive lens of the third lens group G3 closest to the image side from being too strong, and there is an advantage in suppressing the occurrence of the spherical aberration. By not allowing the result of Conditional Expression (4) to be equal to or greater than an upper limit, there is an advantage in reducing the lens diameter of the fourth lens group G4 which is the focus group, and there is an advantage in achieving high-speed focusing and reducing an outer diameter of a product. In addition, in a case of a configuration in which Conditional Expression (4-1) is satisfied, it is possible to obtain more favorable characteristics.

$$0.16 < f3r/f3 < 0.4 \quad (4)$$

$$0.2 < f3r/f3 < 0.36 \quad (4\text{-}1)$$

In the zoom lens according to the present embodiment, assuming that a distance on the optical axis between the lens surface of the third lens group G3 closest to the image side and the lens surface of the fourth lens group G4 closest to the object side at the wide-angle end is D34W and a distance on the optical axis between the lens surface of the third lens group G3 closest to the image side and the lens surface of the fourth lens group G4 closest to the object side at the telephoto end is D34T, it is preferable that the following Conditional Expression (5) is satisfied. By not allowing the result of Conditional Expression (5) to be equal to or less than a lower limit, since it is possible to suppress the height of off-axis rays in the fourth lens group G4 at the telephoto end, it is possible to reduce the lens diameter of the fourth lens group G4 which is the focus group. Accordingly, there is an advantage in securing a space for mechanical components of the focusing drive system, achieving high-speed focusing, and reducing an outer diameter of a product. By not allowing the result of Conditional Expression (5) to be equal to or greater than an upper limit, it is possible to reduce the total length of the lens at the wide-angle end. In addition, in a case of a configuration in which Conditional Expression (5-1) is satisfied, it is possible to obtain more favorable characteristics.

$$0.2 < D34W/D34T < 1.2 \quad (5)$$

$$0.3 < D34W/D34T < 1 \quad (5\text{-}1)$$

In the zoom lens according to the present embodiment, assuming that the lens of the third lens group G3 closest to the object side is the positive lens and an Abbe number of the positive lens of the third lens group G3 closest to the object side at the d line is v3f, it is preferable that the following Conditional Expression (6) is satisfied. By not allowing the result of Conditional Expression (6) to be equal to or less than a lower limit, there is an advantage in correcting longitudinal chromatic aberration. By not allowing the result of Conditional Expression (6) to be equal to or greater than an upper limit, there is an advantage in suppressing fluctuations in lateral chromatic aberration at the wide-angle end and the telephoto end. In addition, in a case of a configuration in which Conditional Expression (6-1) is satisfied, it is possible to obtain more favorable characteristics.

$$25 < v3f < 49 \quad (6)$$

$$28 < v3f < 45 \quad (6\text{-}1)$$

FIG. 1 illustrates the example in which the optical member PP is disposed between the lens system and the image plane Sim. However, various filters may be disposed between the lenses instead of disposing the low-pass filter and/or the various filters for shielding rays with a specific wavelength range between the lens system and the image plane Sim, or the various filters the lens surface of any of the lenses may be coated so as to have the same functions as the various filters.

The above-mentioned preferred configurations and available configurations may be arbitrary combinations, and it is preferable that the configurations are selectively adopted in accordance with required specification. In accordance with the zoom lens according to the present embodiment, it is possible to achieve high optical performance obtained by satisfactorily correcting various aberrations with a small lens system suitable for small and light body such as the mirrorless camera while securing the high zoom ratio. The "high zoom ratio" described herein means a zoom ratio of 10 times or more.

Next, numerical examples of the zoom lens of the present invention will be described.

Example 1

FIGS. 1 and 2 are cross-sectional views of a zoom lens of Example 1, and an illustration method thereof is as described above. Therefore, repeated description is partially omitted herein. The zoom lens of Example 1 consists of a first lens group G1 having a positive refractive power, a second lens group G2 having a negative refractive power, an aperture stop St, a third lens group G3 having a positive refractive power, a fourth lens group G4 having a negative refractive power, a fifth lens group G5 having a negative refractive power, and a sixth lens group G6 having a positive refractive power in order from the object side to the image side. All the lens groups move in the optical axis direction with different loci during zooming, and the aperture stop St moves integrally with the third lens group G3. The first lens group G1 consists of three lenses such as lenses L11 to L13 in order from the object side to the image side, the second lens group G2 consists of four lenses such as lenses L21 to L24 in order from the object side to the image side, the third lens group G3 consists of five lenses such as lenses L31 to L35 in order from the object side to the image side, the fourth lens group G4 consists of two lenses such as lenses L41 and L42 in order from the object side to the image side, the fifth lens group G5 consists of one lens such as a lens L51, and the sixth lens group G6 consists of one lens such as a lens L61. The focus group consists of the fourth lens group G4, and the fourth lens group G4 moves toward the image side during the focusing from the object with a long range to an object with a short range. The anti-vibration lens group consists of the lens L35. The outline of the zoom lens of Example 1 has been described above.

Table 1 shows basic lens data of the zoom lens of Example 1, Table 2 shows variable surface distances, and Table 3 shows aspherical surface coefficients thereof. In Table 1, the column of Sn shows surface numbers. The surface closest to the object side is the first surface, and the surface numbers increase one by one toward the image side. The column of R shows radii of curvature of the respective surfaces. The column of D shows surface distances on the optical axis between the respective surfaces and the surfaces adjacent to the image side. Further, the column of Nd shows a refractive index of each constituent element at the d line, the column of vd shows an Abbe number of each constituent element at the d line, and the column of θgF shows a partial dispersion ratio of each constituent element between the g line and the F line. It should be noted that the partial dispersion ratio θgF between the g line and the F line of a certain lens is defined by θgF=(Ng−NF)/(NF−NC), where the refractive indexes of the lens at the g line (a wavelength of 435.8 nm (nanometers)), F line (a wavelength of 486.1 nm (nanometers)), and C line (a wavelength of 656.3 nm (nanometers)) are Ng, NF, and NC, respectively.

In Table 1, reference signs of radii of curvature of surface shapes convex toward the object side are set to be positive, and reference signs of radii of curvature of surface shapes convex toward the image side are set to be negative. Table 1 additionally shows the aperture stop St and the optical member PP. In Table 1, in a place of a surface number of a surface corresponding to the aperture stop St, the surface number and a term of (St) are noted. A value at the bottom place of D in Table 1 indicates a distance between the image plane Sim and the surface closest to the image side in the table. In Table 1, the variable surface distances are referenced by the reference signs DD[ ], and are written into places of D, where object side surface numbers of distances are noted in [ ].

In Table 2, values of the zoom ratio Zr, the focal length f of the entire system, the F number FNo., the maximum total angle of view 2ω, and the variable surface distance are based on the d line. (°) in the place of 2ω indicates that the unit thereof is a degree. In Table 2, values in the wide-angle end state, the middle focal length state, and the telephoto end state are respectively shown in the columns labeled by WIDE, MIDDLE, and TELE. Tables 1 and 2 are values in a state where the object at infinity is in focus.

In Table 1, the reference sign * is attached to surface numbers of aspherical surfaces, and numerical values of the paraxial radius of curvature are written into the column of the radius of curvature of the aspherical surface. In Table 3, the column of Sn shows surface numbers of aspherical surfaces, and the columns of KA and Am (m=3, 4, 5, . . . ) show numerical values of the aspherical surface coefficients of the aspherical surfaces. The "E±n" (n: an integer) in numerical values of the aspherical surface coefficients of Table 3 indicates "×10$^{±n}$". KA and Am are aspherical surface coefficients in an aspherical surface expression expressed in the following expression.

$$Zd = C \times h^2 / \{1 + (1 - KA \times C^2 \times h^2)^{1/2}\} + \Sigma Am \times h^m$$

Here, Zd is an aspherical surface depth (a length of a perpendicular from a point on an aspherical surface at height h to a plane that is perpendicular to the optical axis and contacts with the vertex of the aspherical surface), h is a height (a distance from the optical axis to the lens surface), C is a paraxial curvature, KA and Am are aspherical surface coefficients, and Σ in the aspherical surface expression means the sum with respect to m.

In data of each table, a degree is used as a unit of an angle, and mm (millimeter) is used as a unit of a length, but appropriate different units may be used since the optical system can be used even in a case where the system is enlarged or reduced in proportion. Further, each of the following tables shows numerical values rounded off to predetermined decimal places.

TABLE 1

| | Example 1 | | | | |
|---|---|---|---|---|---|
| Sn | R | D | Nd | vd | θgF |
| 1 | 87.31341 | 1.500 | 1.64769 | 33.79 | 0.59393 |
| 2 | 48.39202 | 7.086 | 1.49700 | 81.61 | 0.53887 |
| 3 | 477.38483 | 0.150 | | | |
| 4 | 56.81528 | 5.128 | 1.53775 | 74.70 | 0.53936 |
| 5 | 246.16254 | DD[5] | | | |
| *6 | 55.36248 | 1.400 | 1.85400 | 40.38 | 0.56890 |
| *7 | 13.70066 | 7.020 | | | |
| 8 | −25.12016 | 0.710 | 1.56384 | 60.67 | 0.54030 |
| 9 | 16.72513 | 4.912 | 1.78470 | 26.29 | 0.61360 |
| 10 | −96.61318 | 2.010 | | | |
| 11 | −18.06216 | 0.700 | 1.83481 | 42.74 | 0.56490 |
| 12 | −31.78051 | DD[12] | | | |
| 13(St) | ∞ | 0.800 | | | |
| *14 | 22.13205 | 3.000 | 1.73077 | 40.51 | 0.57279 |
| *15 | −362.34440 | 0.220 | | | |
| 16 | 17.38795 | 5.855 | 1.49700 | 81.61 | 0.53887 |
| 17 | −20.92786 | 0.150 | | | |
| 18 | −44.52809 | 0.600 | 1.91082 | 35.25 | 0.58224 |
| 19 | 11.32204 | 3.082 | 1.48749 | 70.24 | 0.53007 |
| 20 | 22.32907 | 2.500 | | | |
| *21 | 17.78291 | 4.834 | 1.59522 | 67.73 | 0.54426 |
| *22 | −27.18638 | DD[22] | | | |
| 23 | 63.06222 | 2.260 | 1.80518 | 25.42 | 0.61616 |
| 24 | −41.22773 | 0.600 | 1.83481 | 42.74 | 0.56490 |
| 25 | 16.32477 | DD[25] | | | |
| *26 | −39.90460 | 1.000 | 1.58913 | 61.15 | 0.53824 |
| *27 | −94.88059 | DD[27] | | | |
| 28 | −305.20925 | 4.318 | 1.48749 | 70.24 | 0.53007 |
| 29 | −29.97475 | DD[29] | | | |
| 30 | ∞ | 2.850 | 1.54763 | 54.99 | 0.55229 |
| 31 | ∞ | 1.000 | | | |

TABLE 2

| | Example 1 | | |
|---|---|---|---|
| | WIDE | MIDDLE | TELE |
| Zr | 1.0 | 3.5 | 10.5 |
| f | 18.561 | 65.746 | 194.393 |
| FNo. | 3.61 | 5.48 | 6.47 |
| 2ω(°) | 79.4 | 23.8 | 8.4 |
| DD[5] | 0.800 | 27.120 | 55.203 |
| DD[12] | 22.391 | 5.710 | 1.413 |
| DD[22] | 1.410 | 7.768 | 3.481 |
| DD[25] | 3.609 | 9.805 | 12.474 |
| DD[27] | 1.555 | 12.369 | 20.714 |
| DD[29] | 18.560 | 15.026 | 28.237 |

TABLE 3

Example 1

| Sn | 6 | 7 | 14 | 15 |
|---|---|---|---|---|
| KA | 1.0000000E+00 | 1.0000000E+00 | 1.0000000E+00 | 1.0000000E+00 |
| A3 | 6.0884124E−20 | 3.1609393E−20 | 0.0000000E+00 | 0.0000000E+00 |
| A4 | 2.8326464E−05 | 2.9801311E−05 | 2.8066378E−05 | 6.1678411E−05 |
| A5 | 1.1489287E−06 | 5.4539706E−07 | −3.4252381E−06 | −2.9478889E−06 |
| A6 | −2.9957092E−07 | 3.4300881E−09 | 1.8853685E−07 | 3.3641935E−07 |
| A7 | 5.8467260E−10 | −9.2582971E−10 | 1.0121366E−07 | 8.6043403E−08 |
| A8 | 7.7494336E−10 | −2.0891091E−09 | −7.9601873E−09 | −6.0738970E−09 |
| A9 | −1.7916951E−13 | 4.2592750E−11 | −3.9839618E−10 | −2.7515833E−10 |
| A10 | −7.0429475E−13 | 5.8027364E−12 | 3.3051389E−11 | 2.3660643E−11 |

| Sn | 21 | 22 | 26 | 27 |
|---|---|---|---|---|
| KA | 1.0000000E+00 | 1.0000000E+00 | 1.0000000E+00 | 1.0000000E+00 |
| A3 | 0.0000000E+00 | −7.8958738E−20 | 0.0000000E+00 | 0.0000000E+00 |
| A4 | −5.1340861E−05 | 6.3190783E−06 | −8.1994852E−05 | −7.6635563E−05 |
| A5 | 2.6767577E−06 | 3.4589922E−06 | −6.2138338E−06 | −4.4994630E−06 |
| A6 | 1.9995563E−07 | 1.3626643E−07 | 2.9069889E−06 | 2.3717541E−06 |
| A7 | −3.5718992E−08 | −6.1853729E−08 | 5.8614043E−08 | 2.3574149E−08 |
| A8 | −2.8828242E−09 | −2.0630871E−10 | −4.4557451E−08 | −3.2482571E−08 |
| A9 | 1.2759959E−10 | 2.7289586E−10 | −2.5187227E−10 | −9.6837820E−11 |
| A10 | 1.1785166E−11 | −2.0553184E−13 | 2.0469383E−10 | 1.4408906E−10 |

Figure 7:
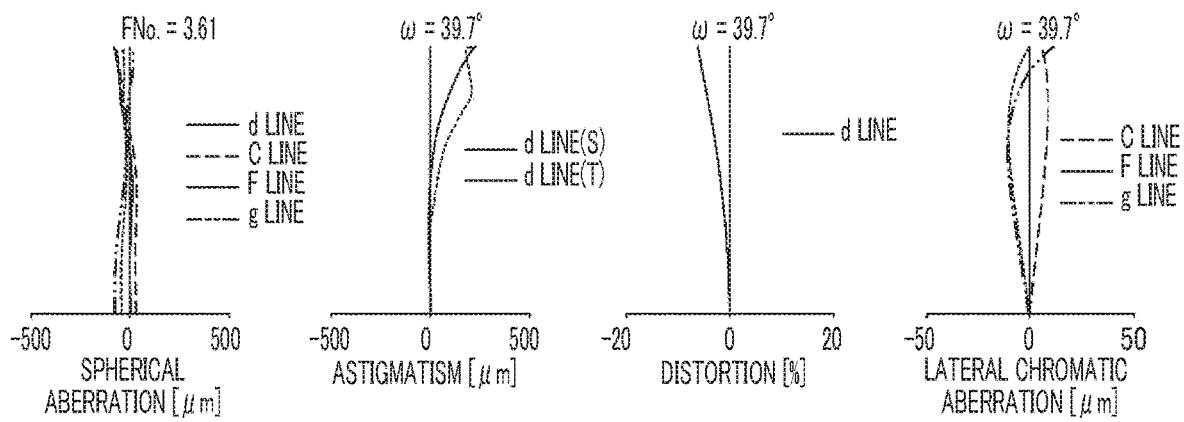
FIG. 7 is a diagram of aberrations of the zoom lens according to Example 1 of the present invention during focusing on an object at infinity.
Figure 7:
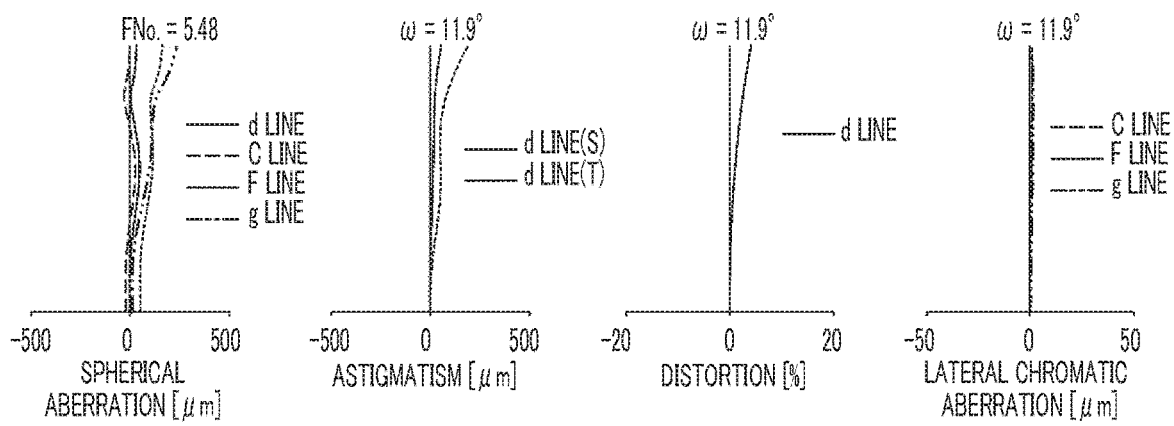
Figure 7:
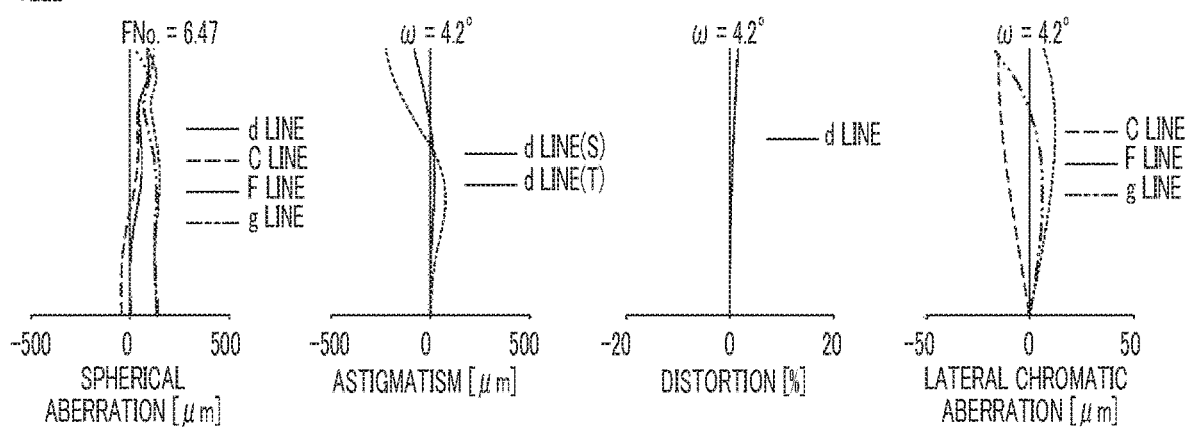

FIG. 7 shows aberration diagrams of the zoom lens of Example 1 in a state where the object at infinity is brought into focus. In FIG. 7, in order from the left side, spherical aberration, astigmatism, distortion, and lateral chromatic aberration are shown. In FIG. 7, the upper part labeled by WIDE shows a diagram of aberrations in the wide-angle end state, the middle part labeled by MIDDLE shows a diagram of aberrations in the middle focal length state, the lower part labeled by TELE shows a diagram of aberrations in the telephoto end state. In the spherical aberration diagram, aberrations at the d line, the C line, the F line, and the g line are respectively indicated by the black solid line, the long dashed line, the short dashed line, and the dashed double-dotted line. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration diagram, aberrations at the C line, the F line, and the g line are respectively indicated by the long dashed line, the short dashed line, and the dashed double-dotted line. In the spherical aberration diagram, FNo. indicates an F number. In the other aberration diagrams, ω indicates a half angle of view.

Figure 8:
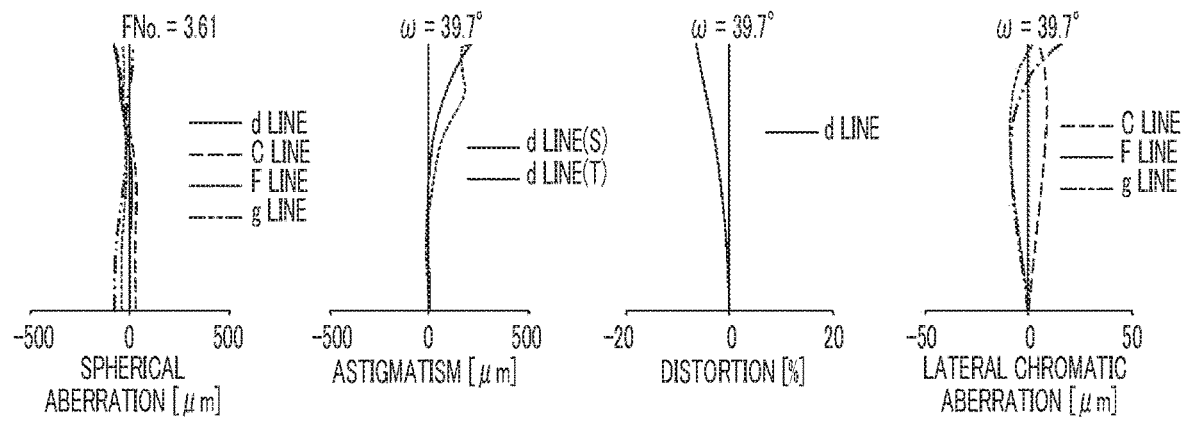
FIG. 8 is a diagram of aberrations of the zoom lens according to Example 1 of the present invention during focusing on an object at a finite distance.
Figure 8:
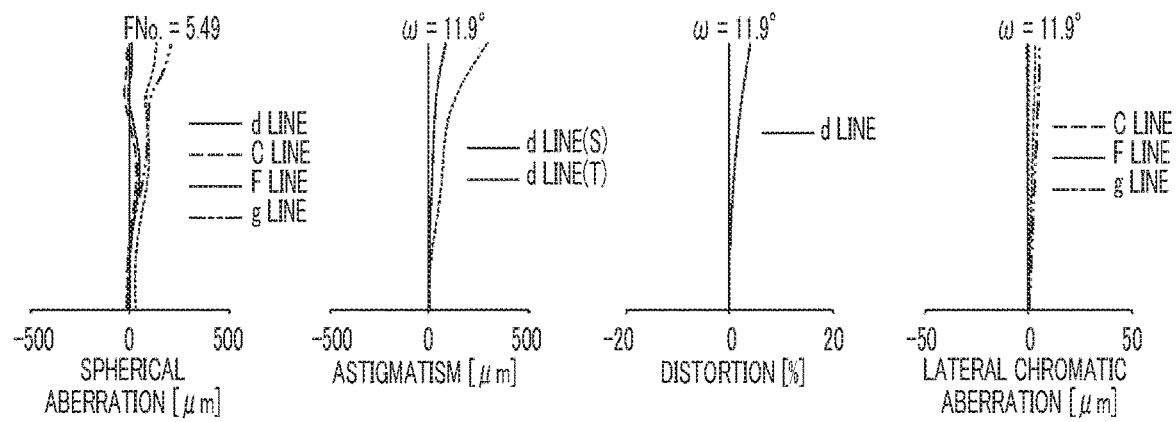
Figure 8:
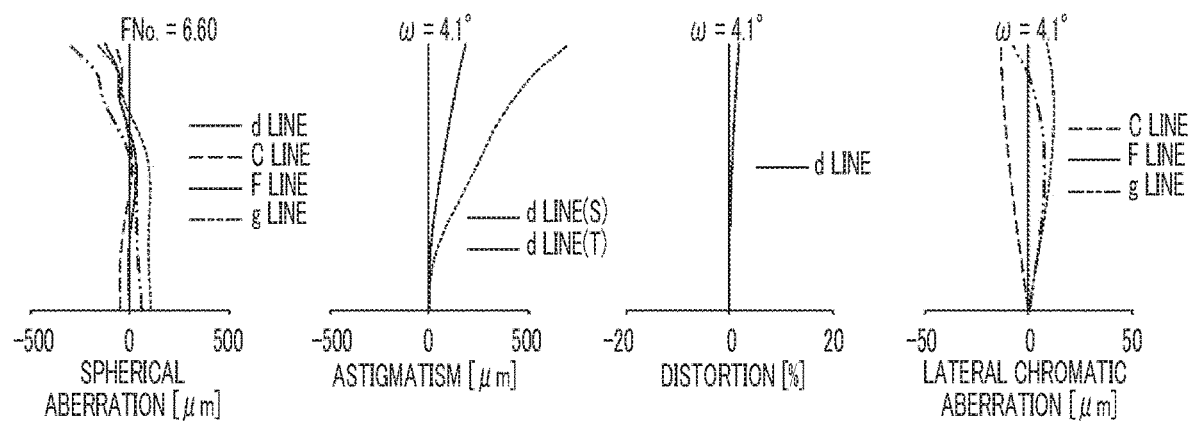

FIG. 8 shows aberration diagrams of the zoom lens of Example 1 in a state where an object at a finite distance is brought into focus. FIG. 8 shows the aberration diagrams in a state where an object at a distance of 1.5 meters (m) from the image plane Sim is brought into focus, and the illustration method and the meanings of reference signs are the same as those in FIG. 7.

Reference signs, meanings, description methods, illustration methods of the respective data pieces related to Example 1 are the same as those in the following examples unless otherwise noted. Therefore, in the following description, repeated description will be omitted.

Example 2

Figure 3:
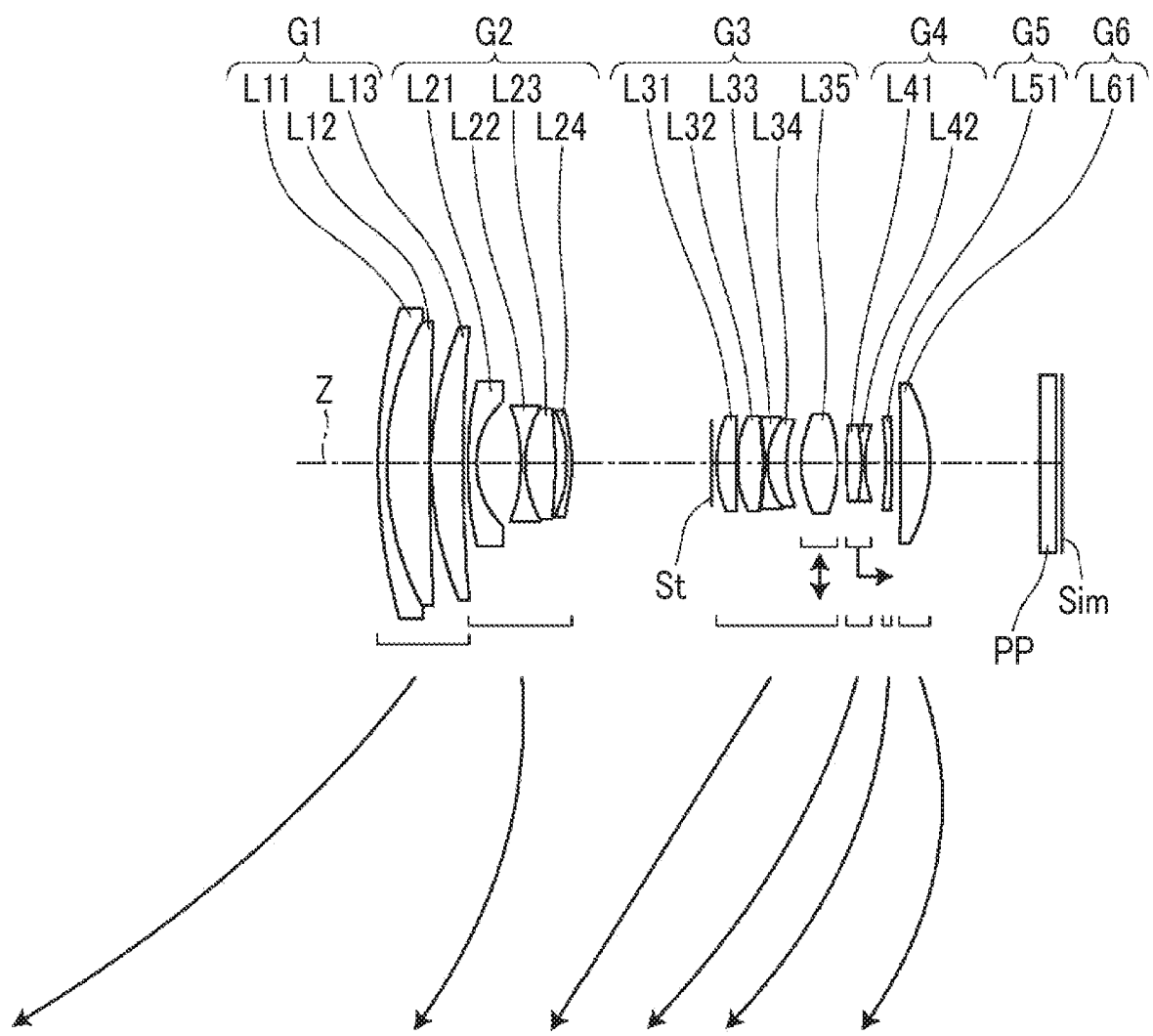
FIG. 3 is a cross-sectional view illustrating a lens configuration and a movement locus of a zoom lens according to Example 2 of the present invention at the wide-angle end.
Figure 9:
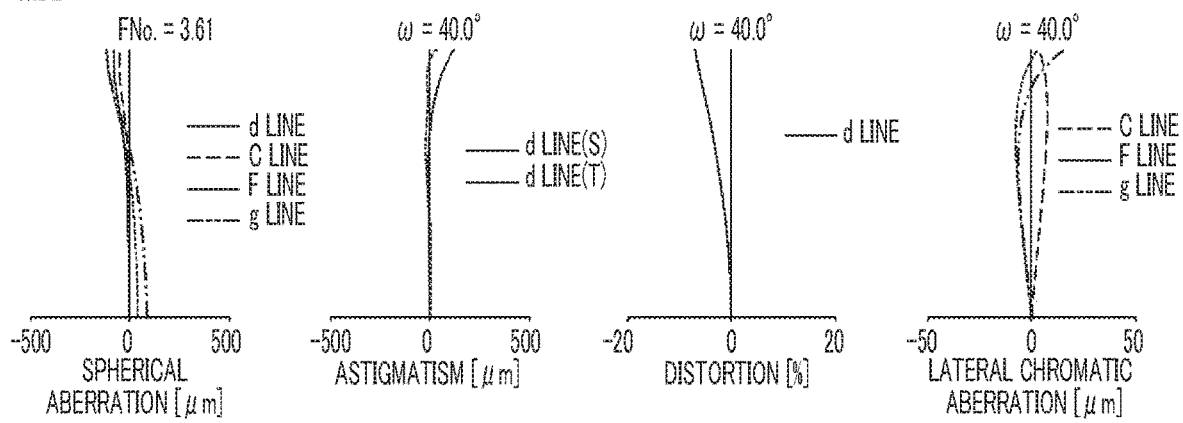
FIG. 9 is a diagram of aberrations of the zoom lens according to Example 2 of the present invention during focusing on an object at infinity.
Figure 9:
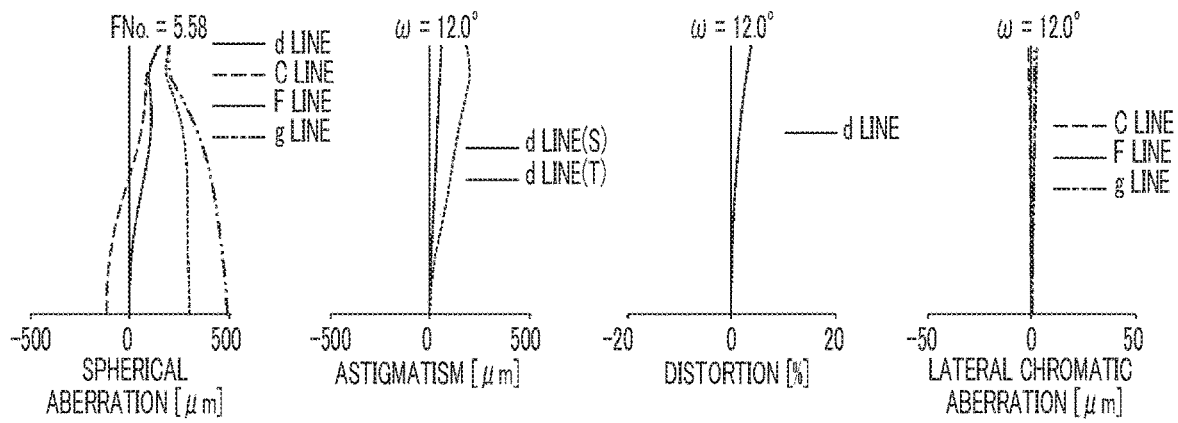
Figure 9:
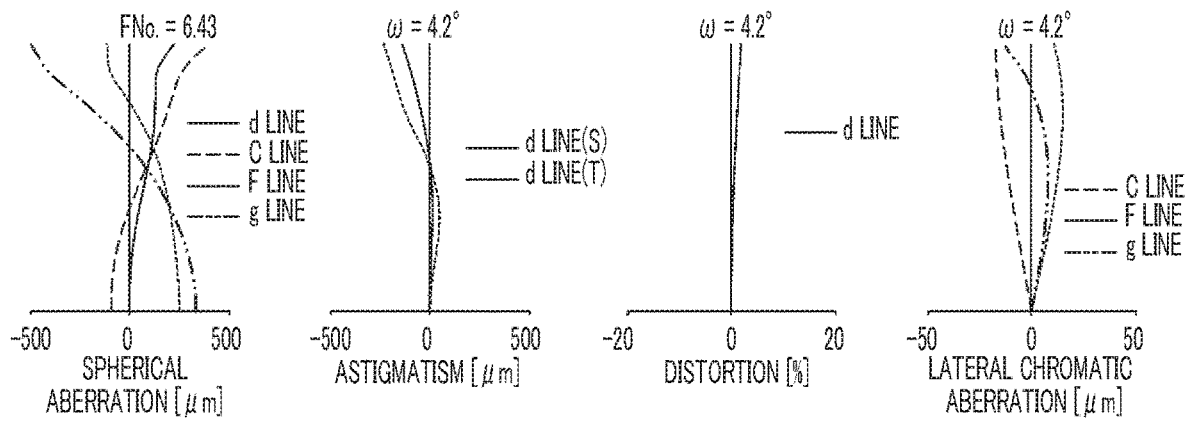
Figure 10:
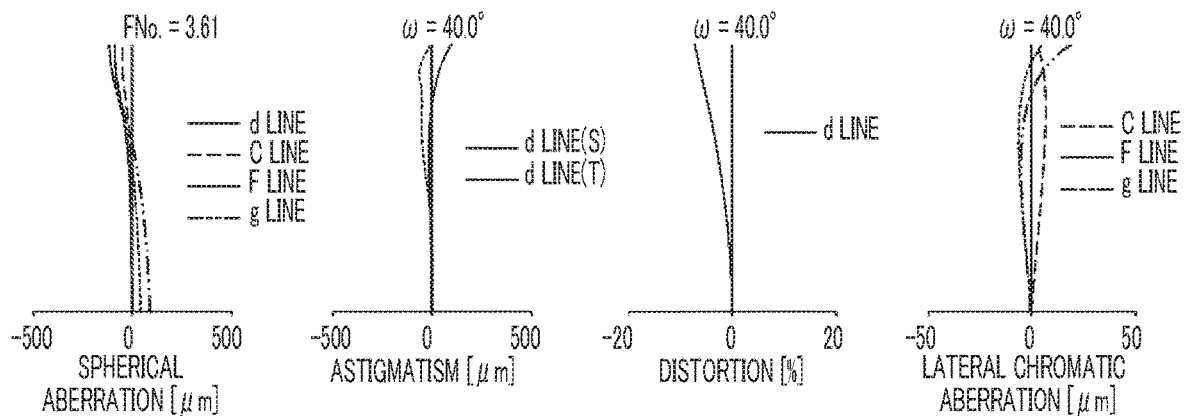
FIG. 10 is a diagram of aberrations of the zoom lens according to Example 2 of the present invention during focusing on an object at a finite distance.
Figure 10:
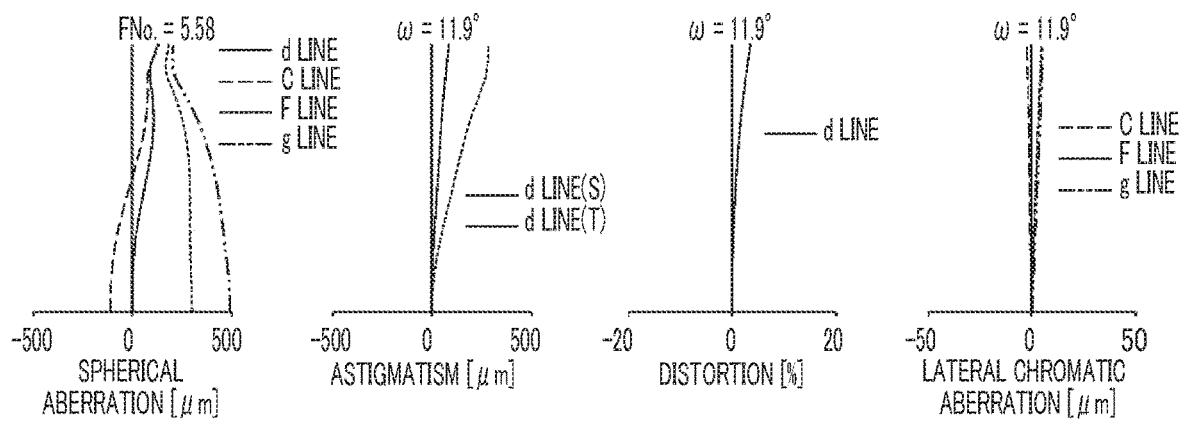
Figure 10:
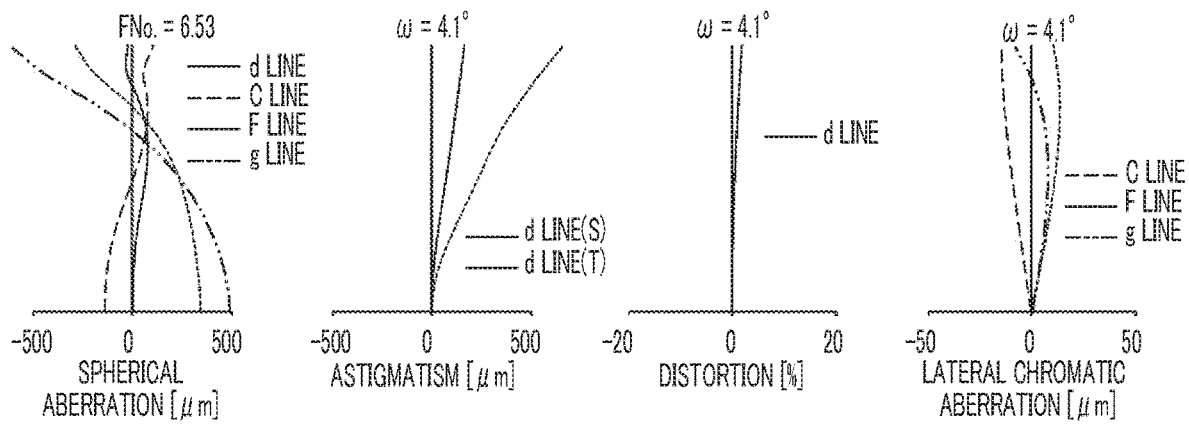

FIG. 3 is a cross-sectional view of a zoom lens of Example 2. The zoom lens of Example 2 has the same configuration as the outline of the zoom lens of Example 1. Table 4 shows basic lens data of the zoom lens of Example 2, Table 5 shows specification and variable surface distances, and Table 6 shows aspherical surface coefficients. FIG. 9 shows aberration diagrams in a state where the object at infinity is in focus, and FIG. 10 shows aberration diagrams in a state where the object at the distance of 1.5 meters (m) from the image plane Sim is in focus.

TABLE 4

Example 2

| Sn | R | D | Nd | vd | θgF |
|---|---|---|---|---|---|
| 1 | 89.36116 | 1.500 | 1.64769 | 33.79 | 0.59393 |
| 2 | 48.66208 | 7.184 | 1.49700 | 81.61 | 0.53887 |
| 3 | 624.11772 | 0.150 | | | |
| 4 | 55.66700 | 5.285 | 1.53775 | 74.70 | 0.53936 |
| 5 | 251.45782 | DD[5] | | | |
| *6 | 73.69591 | 1.400 | 1.85400 | 40.38 | 0.56890 |
| *7 | 14.22386 | 7.396 | | | |
| 8 | −24.86145 | 0.710 | 1.56384 | 60.67 | 0.54030 |
| 9 | 18.18643 | 4.958 | 1.78470 | 26.29 | 0.61360 |
| 10 | −68.22820 | 1.870 | | | |
| 11 | −19.14171 | 0.700 | 1.83481 | 42.74 | 0.56490 |
| 12 | −34.55352 | DD[12] | | | |
| 13(St) | ∞ | 0.800 | | | |
| 14 | 19.48184 | 3.286 | 1.72047 | 34.71 | 0.58350 |
| 15 | −3912.53507 | 0.150 | | | |
| *16 | 17.77430 | 4.284 | 1.49700 | 81.61 | 0.53887 |
| *17 | −35.22151 | 0.150 | | | |
| 18 | −59.85628 | 0.600 | 1.85025 | 30.05 | 0.59797 |
| 19 | 11.59025 | 3.066 | 1.51823 | 58.90 | 0.54567 |
| 20 | 18.47849 | 2.500 | | | |
| *21 | 16.06916 | 5.990 | 1.49700 | 81.61 | 0.53887 |
| *22 | −20.77514 | DD[22] | | | |
| 23 | 57.40271 | 2.494 | 1.80809 | 22.76 | 0.63073 |
| 24 | −33.34983 | 0.600 | 1.85150 | 40.78 | 0.56958 |
| 25 | 17.26158 | DD[25] | | | |
| *26 | −51.63355 | 1.000 | 1.85400 | 40.38 | 0.56890 |
| *27 | −427.82387 | DD[27] | | | |
| 28 | −303.58843 | 4.753 | 1.48749 | 70.24 | 0.53007 |
| 29 | −26.87050 | DD[29] | | | |
| 30 | ∞ | 2.850 | 1.54763 | 54.99 | 0.55229 |
| 31 | ∞ | 1.000 | | | |

TABLE 5

| | Example 2 | | |
|---|---|---|---|
| | WIDE | MIDDLE | TELE |
| Zr | 1.0 | 3.5 | 10.5 |
| f | 18.549 | 65.706 | 194.273 |
| FNo. | 3.61 | 5.58 | 6.43 |
| 2ω (°) | 80.0 | 24.0 | 8.4 |
| DD[5] | 0.800 | 26.073 | 53.559 |
| DD[12] | 23.091 | 6.231 | 1.439 |
| DD[22] | 1.402 | 6.582 | 2.087 |
| DD[25] | 3.448 | 7.369 | 12.095 |
| DD[27] | 1.548 | 15.478 | 20.112 |
| DD[29] | 18.059 | 16.832 | 31.176 |

TABLE 6

| | Example 2 | | | |
|---|---|---|---|---|
| Sn | 6 | 7 | 16 | 17 |
| KA | 1.0000000E+00 | 1.0000000E+00 | 1.0000000E+00 | 1.0000000E+00 |
| A3 | 1.4872458E−20 | −1.5804696E−20 | 0.0000000E+00 | −5.9219054E−20 |
| A4 | 9.9880950E−06 | 7.2736120E−06 | 6.4561280E−06 | 6.8506153E−05 |
| A5 | 1.0183724E−06 | 9.1467469E−07 | −1.3805838E−06 | 2.3334448E−08 |
| A6 | −1.3595997E−07 | −5.6732135E−08 | 5.0858641E−08 | −4.2891278E−07 |
| A7 | 2.4135596E−09 | 5.0591126E−09 | 2.0486473E−08 | 3.4189402E−08 |
| A8 | 1.8300736E−10 | −4.5633190E−10 | −1.4160040E−09 | −1.1728770E−09 |
| A9 | −5.5441720E−12 | 3.0779628E−11 | −6.8076020E−11 | −8.4177376E−11 |
| A10 | −3.7447432E−16 | 1.2345846E−12 | 5.7894643E−12 | 9.2937990E−12 |
| Sn | 21 | 22 | 26 | 27 |
| KA | 1.0000000E+00 | 1.0000000E+00 | 1.0000000E+00 | 1.0000000E+00 |
| A3 | 3.9479369E−20 | 0.0000000E+00 | 0.0000000E+00 | 0.0000000E+00 |
| A4 | −6.4459157E−05 | 1.9607623E−05 | −2.5669774E−05 | −1.7288557E−05 |
| A5 | 4.8073849E−06 | 4.4354601E−06 | 3.5513019E−06 | 3.2501027E−06 |
| A6 | −3.3875873E−07 | −2.3548343E−07 | 7.2615198E−07 | 4.2668168E−07 |
| A7 | −5.8082826E−08 | −6.1152334E−08 | −1.3248243E−07 | −8.6652444E−08 |
| A8 | 3.6898225E−09 | 3.5717402E−09 | −9.7776723E−09 | −7.6715578E−09 |
| A9 | 1.9062263E−10 | 2.6590608E−10 | 7.5444907E−10 | 4.4569658E−10 |
| A10 | −8.4962899E−12 | −1.1516071E−11 | 3.5388901E−11 | 3.8844240E−11 |

Example 3

Figure 4:
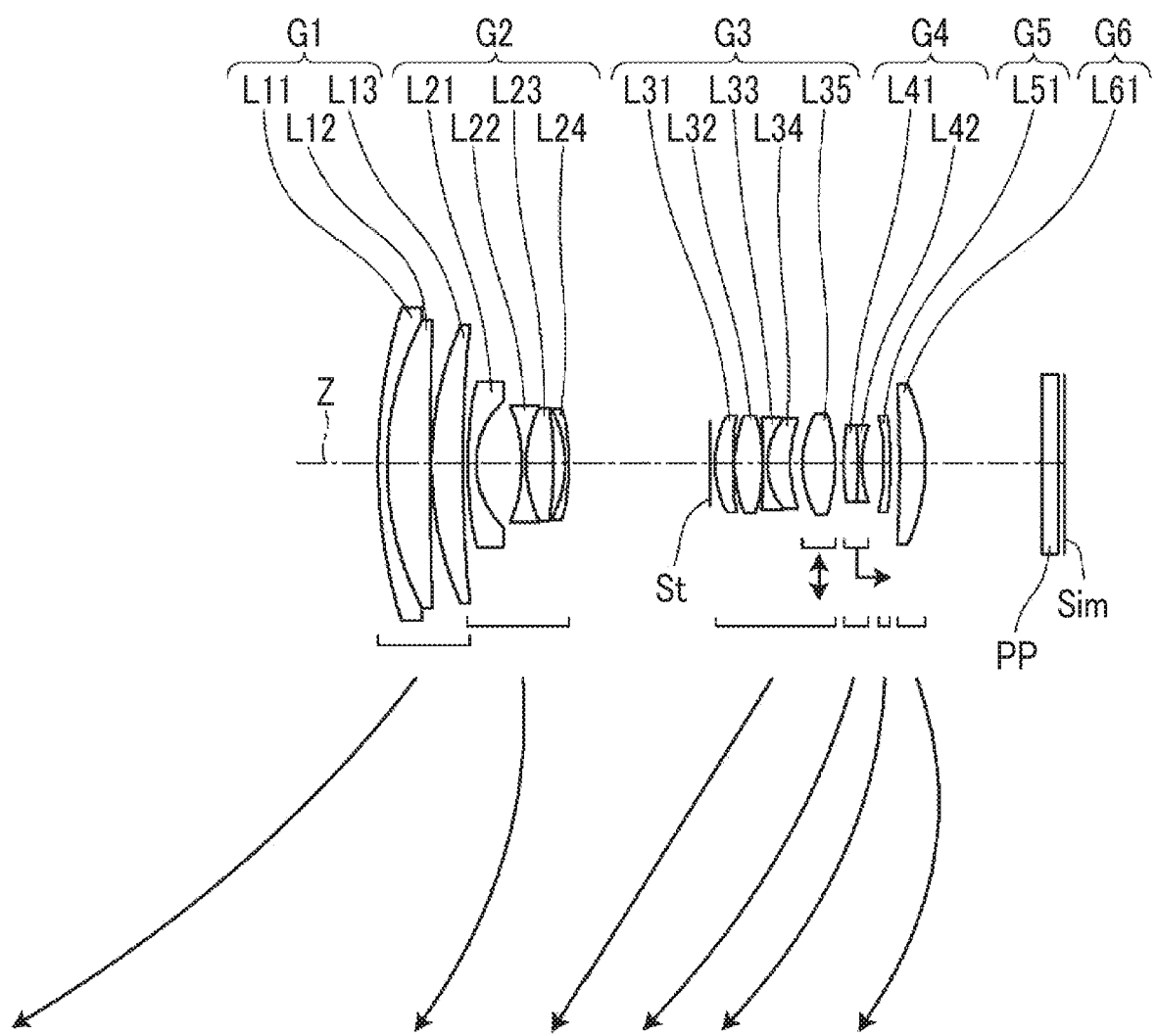
FIG. 4 is a cross-sectional view illustrating a lens configuration and a movement locus of a zoom lens according to Example 3 of the present invention at the wide-angle end.
Figure 11:
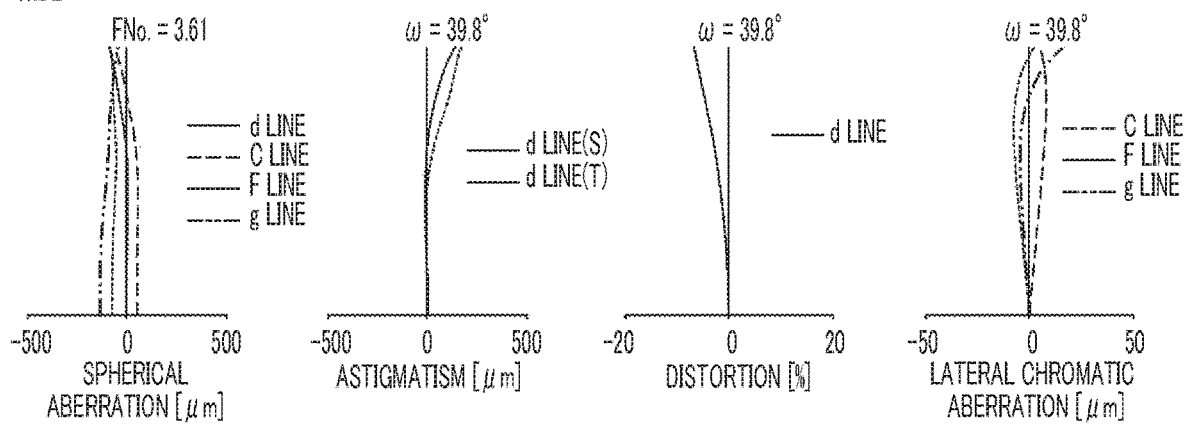
FIG. 11 is a diagram of aberrations of the zoom lens according to Example 3 of the present invention during focusing on an object at infinity.
Figure 11:
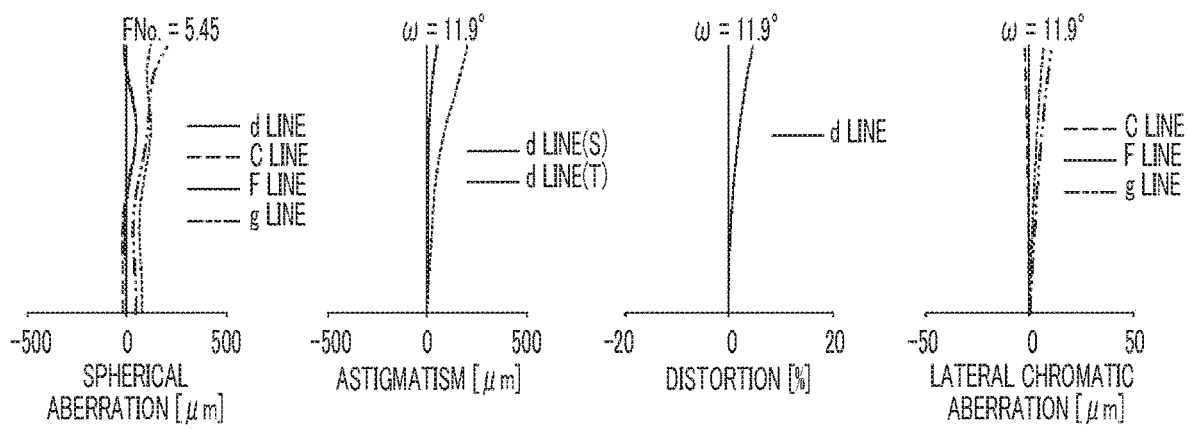
Figure 11:
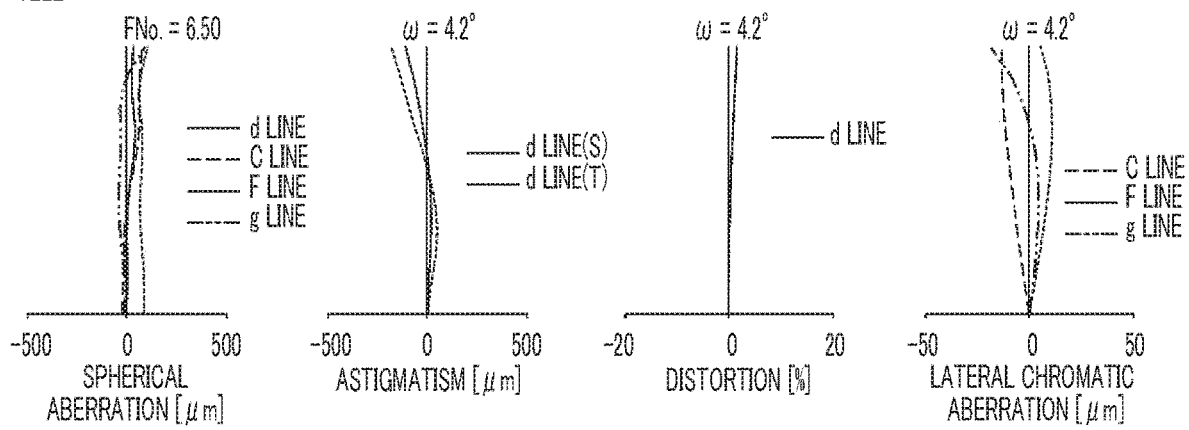
Figure 12:
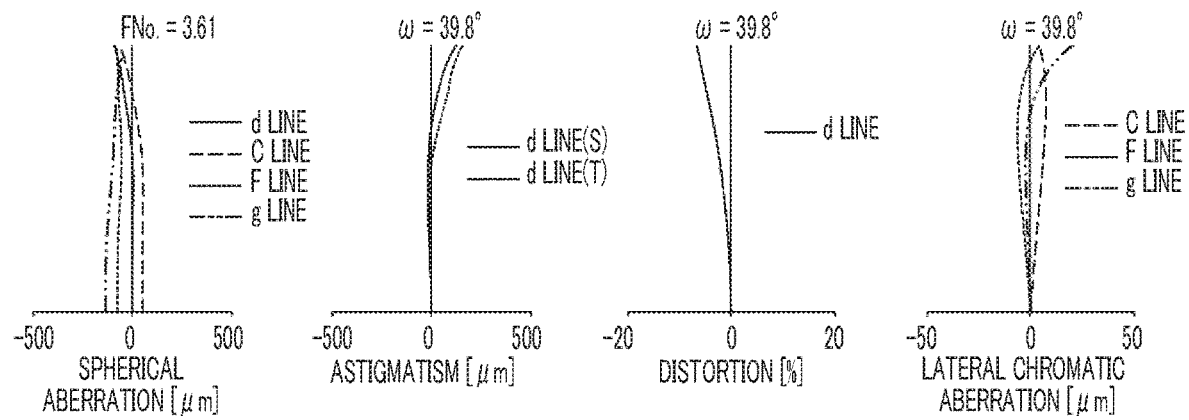
FIG. 12 is a diagram of aberrations of the zoom lens according to Example 3 of the present invention during focusing on an object at a finite distance.
Figure 12:
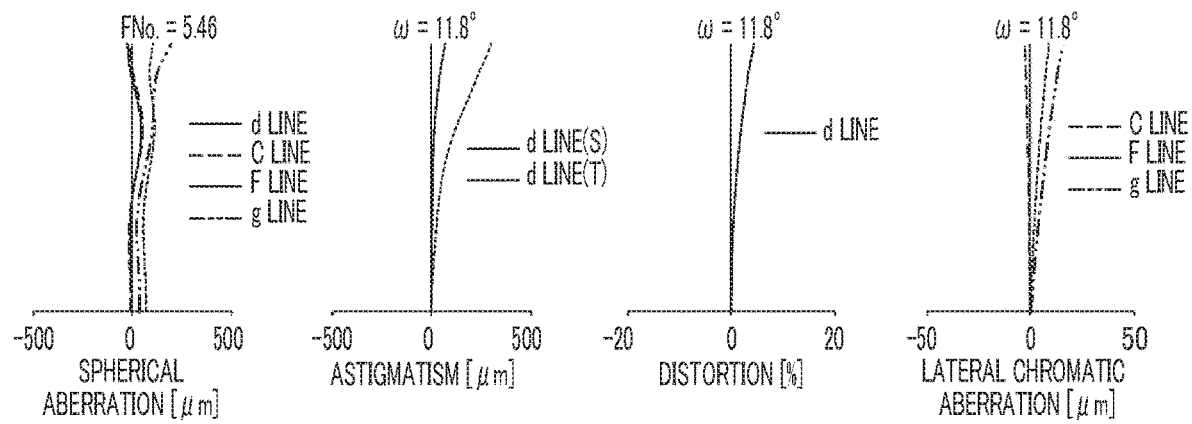
Figure 12:
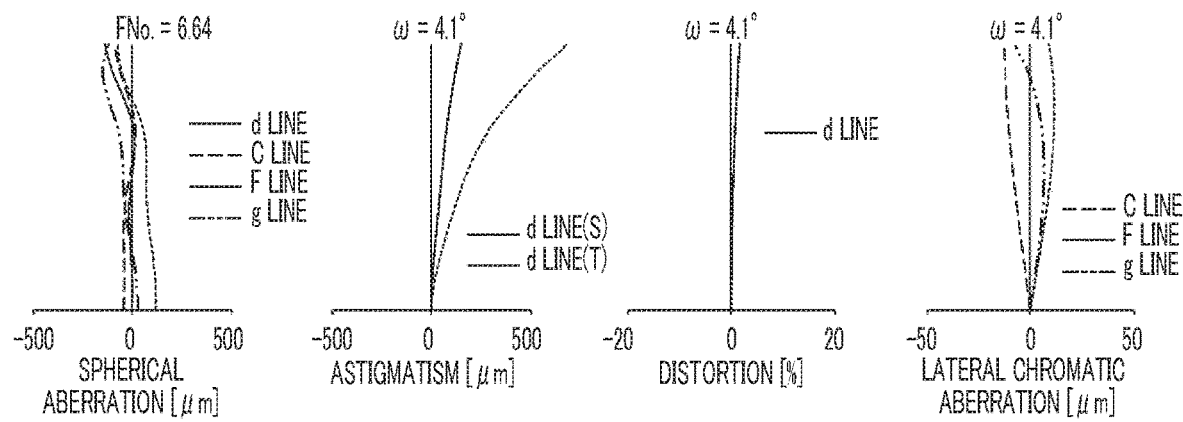

FIG. 4 is a cross-sectional view of a zoom lens of Example 3. The zoom lens of Example 3 has the same configuration as the outline of the zoom lens of Example 1. Table 7 shows basic lens data of the zoom lens of Example 3, Table 8 shows specification and variable surface distances, and Table 9 shows aspherical surface coefficients. FIG. 11 shows aberration diagrams in a state where the object at infinity is in focus, and FIG. 12 shows aberration diagrams in a state where the object at a distance of 1.5 meters (m) from the image plane Sim is in focus.

TABLE 7

| | Example 3 | | | | |
|---|---|---|---|---|---|
| Sn | R | D | Nd | vd | θgF |
| 1 | 84.35548 | 1.500 | 1.66680 | 33.05 | 0.59578 |
| 2 | 49.86137 | 7.135 | 1.49700 | 81.61 | 0.53887 |
| 3 | 914.30159 | 0.150 | | | |
| 4 | 55.41642 | 5.088 | 1.49700 | 81.61 | 0.53887 |
| 5 | 219.05663 | DD[5] | | | |
| *6 | 77.54738 | 1.400 | 1.85400 | 40.38 | 0.56890 |
| *7 | 14.00511 | 7.482 | | | |
| 8 | −23.40369 | 0.710 | 1.51742 | 52.43 | 0.55649 |
| 9 | 21.27185 | 4.309 | 1.84666 | 23.78 | 0.62054 |
| 10 | −82.99347 | 1.975 | | | |

TABLE 7-continued

| | Example 3 | | | | |
|---|---|---|---|---|---|
| Sn | R | D | Nd | vd | θgF |
| 11 | −18.93869 | 0.700 | 1.83481 | 42.74 | 0.56490 |
| 12 | −34.84765 | DD[12] | | | |
| 13(St) | ∞ | 0.800 | | | |
| *14 | 18.10721 | 3.000 | 1.68948 | 31.02 | 0.59874 |
| *15 | 166.66591 | 0.150 | | | |
| 16 | 20.04253 | 4.615 | 1.48749 | 70.24 | 0.53007 |
| 17 | −26.40357 | 0.150 | | | |
| 18 | −81.01070 | 0.600 | 1.85025 | 30.05 | 0.59797 |
| 19 | 11.04283 | 3.759 | 1.48749 | 70.24 | 0.53007 |
| 20 | 20.77056 | 2.000 | | | |
| *21 | 15.59120 | 5.316 | 1.49700 | 81.61 | 0.53887 |

TABLE 7-continued

| | Example 3 | | | | |
|---|---|---|---|---|---|
| Sn | R | D | Nd | vd | θgF |
| *22 | −22.66772 | DD[22] | | | |
| 23 | 58.90229 | 2.260 | 1.80809 | 22.76 | 0.63073 |
| 24 | −56.84010 | 0.600 | 1.83481 | 42.74 | 0.56490 |
| 25 | 16.70752 | DD[25] | | | |
| *26 | −52.64194 | 1.000 | 1.58313 | 59.38 | 0.54237 |
| *27 | −465.69662 | DD[27] | | | |
| 28 | −268.68277 | 4.238 | 1.48749 | 70.24 | 0.53007 |
| 29 | −30.27833 | DD[29] | | | |
| 30 | ∞ | 2.850 | 1.54763 | 54.99 | 0.55229 |
| 31 | ∞ | 1.000 | | | |

TABLE 8

| | Example 3 | | |
|---|---|---|---|
| | WIDE | MIDDLE | TELE |
| Zr | 1.0 | 3.5 | 10.5 |
| f | 18.562 | 65.752 | 194.408 |
| FNo. | 3.61 | 5.45 | 6.50 |
| 2ω (°) | 79.6 | 23.8 | 8.4 |
| DD[5] | 0.800 | 25.333 | 54.582 |
| DD[12] | 22.927 | 4.526 | 1.436 |
| DD[22] | 1.485 | 8.591 | 2.463 |

TABLE 8-continued

Example 3

| | WIDE | MIDDLE | TELE |
|---|---|---|---|
| DD[25] | 3.562 | 8.538 | 12.273 |
| DD[27] | 1.563 | 11.237 | 22.683 |
| DD[29] | 18.947 | 16.893 | 28.982 |

TABLE 9

Example 3

| Sn | 6 | 7 | 14 | 15 |
|---|---|---|---|---|
| KA | 1.0000000E+00 | 1.0000000E+00 | 1.0000000E+00 | 1.0000000E+00 |
| A3 | 5.9489831E-20 | 3.9511741E-21 | 0.0000000E+00 | -7.8958738E-20 |
| A4 | 3.3317471E-05 | 3.0882086E-05 | 2.9397718E-05 | 7.1465901E-05 |
| A5 | -1.0602309E-06 | -1.8307406E-06 | -4.3654816E-06 | -4.9256857E-06 |
| A6 | -1.8424144E-07 | 2.6184353E-08 | 1.7942032E-07 | 5.6723298E-07 |
| A7 | 1.2871194E-08 | 5.8190261E-09 | 1.2213072E-07 | 8.6738357E-08 |
| A8 | -6.1153209E-11 | -9.7055271E-10 | -9.7640910E-09 | -8.7847359E-09 |
| A9 | -1.8149390E-11 | 7.7475782E-12 | -4.9894742E-10 | -3.3351354E-10 |
| A10 | 6.7379815E-13 | 1.3073137E-13 | 4.2884152E-11 | 2.9522644E-11 |

| Sn | 21 | 22 | 26 | 27 |
|---|---|---|---|---|
| KA | 1.0000000E+00 | 1.0000000E+00 | 1.0000000E+00 | 1.0000000E+00 |
| A3 | 1.1843811E-19 | 0.0000000E+00 | -8.6736174E-20 | 0.0000000E+00 |
| A4 | -6.7317725E-05 | 1.2230681E-05 | -1.6512370E-04 | -1.4948073E-04 |
| A5 | 6.9008062E-06 | 8.3632239E-06 | 1.4807192E-05 | 1.1190323E-05 |
| A6 | -6.4244335E-07 | -8.0693892E-07 | 1.5665174E-06 | 1.8223591E-06 |
| A7 | -9.9583275E-09 | -1.5523467E-08 | -3.1692500E-07 | -3.0535606E-07 |
| A8 | 6.4411699E-09 | 7.6978380E-09 | -1.8203805E-09 | -3.3842656E-09 |
| A9 | -2.6847434E-10 | -2.8383497E-10 | 1.4765209E-09 | 1.6966984E-09 |
| A10 | -1.4111654E-11 | 6.6584360E-12 | -5.2262792E-11 | -5.4110442E-11 |
| A11 | 1.1510986E-12 | 1.5517724E-12 | | |
| A12 | -1.4260736E-14 | -1.4214960E-13 | | |

Example 4

Figure 5:
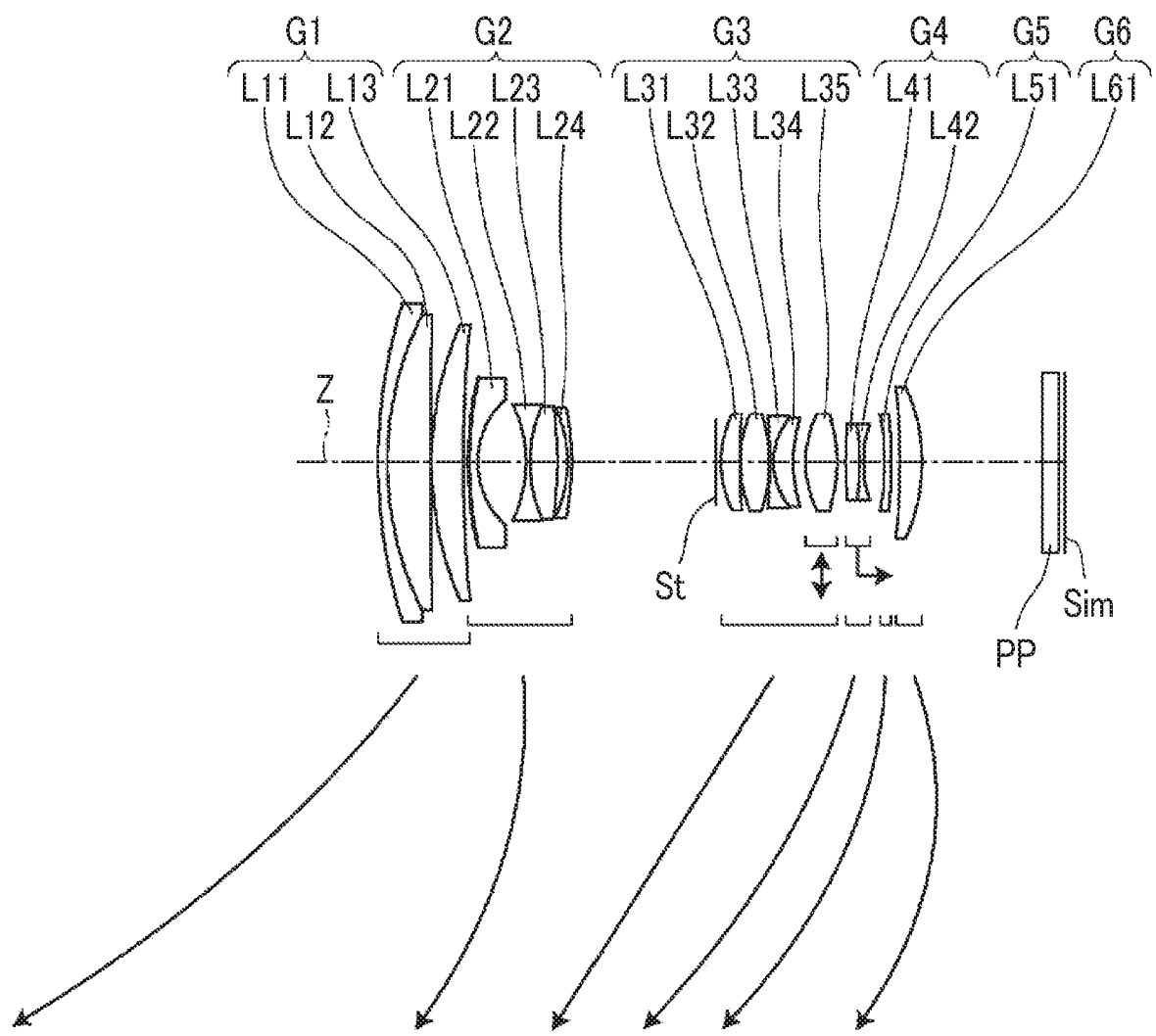
FIG. 5 is a cross-sectional view illustrating a lens configuration and a movement locus of a zoom lens according to Example 4 of the present invention at the wide-angle end.
Figure 13:
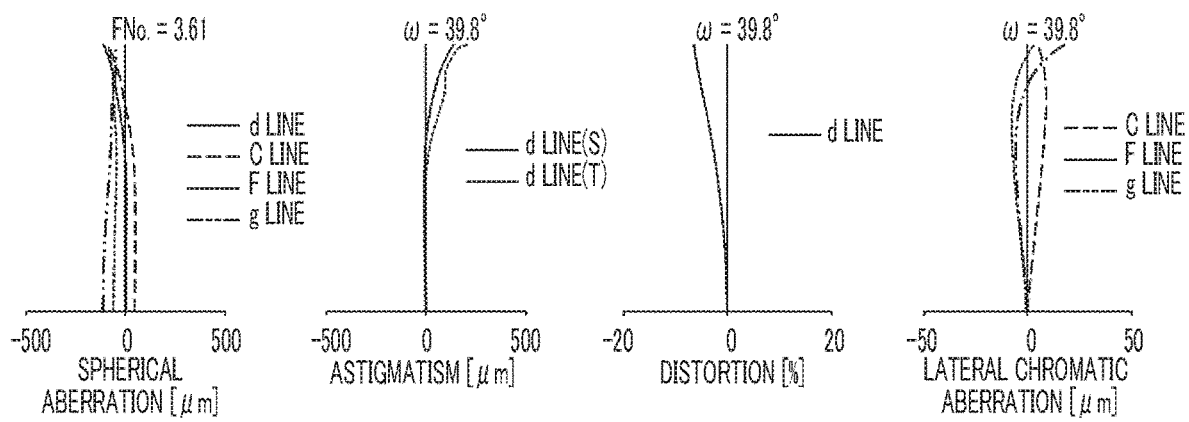
FIG. 13 is a diagram of aberrations of the zoom lens according to Example 4 of the present invention during focusing on an object at infinity.
Figure 13:
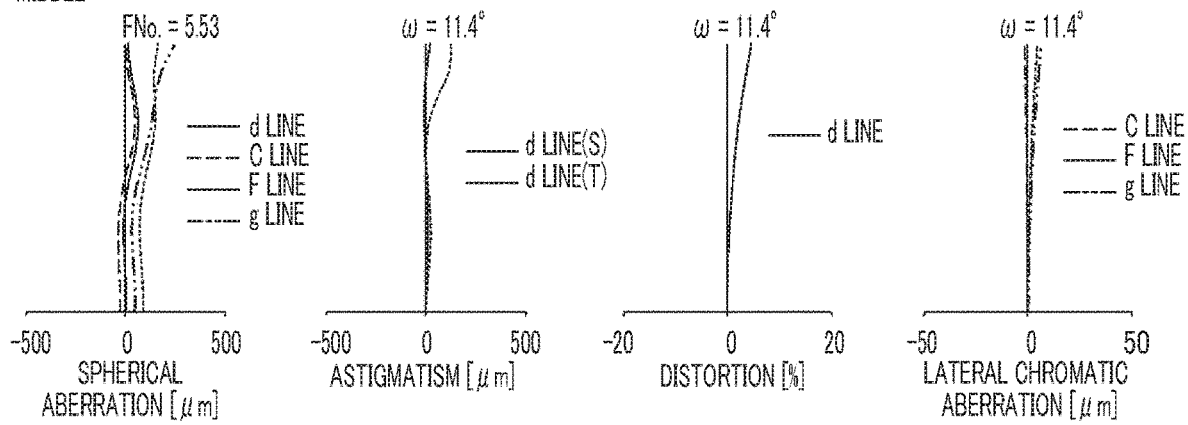
Figure 13:
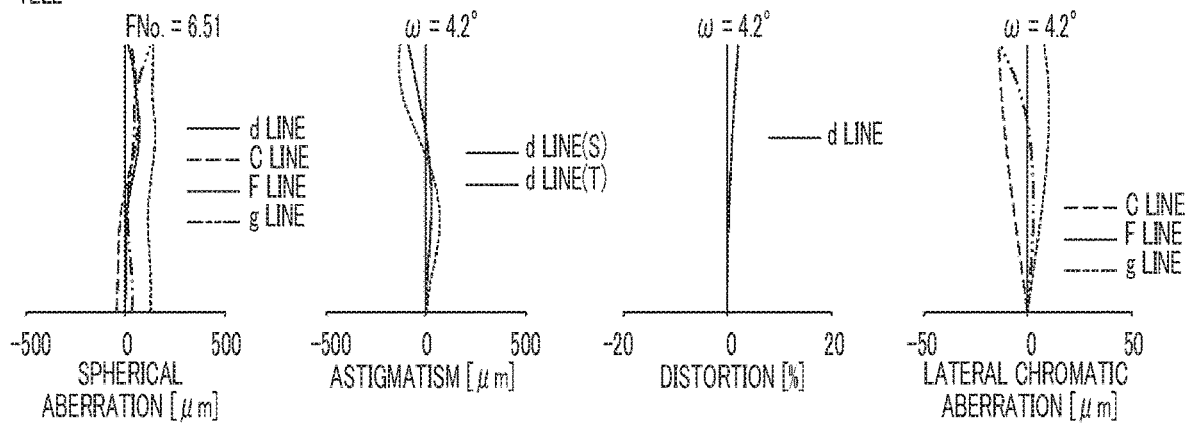
Figure 14:
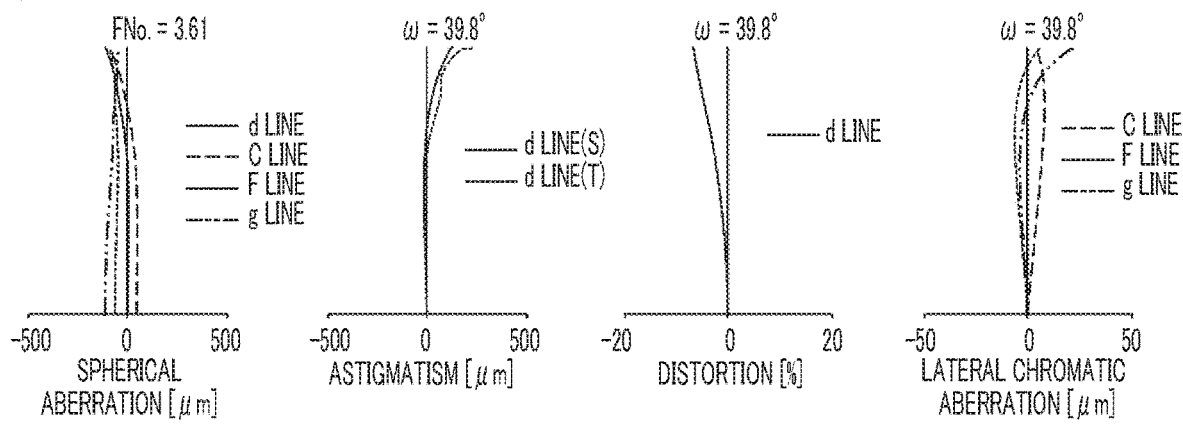
FIG. 14 is a diagram of aberrations of the zoom lens according to Example 4 of the present invention during focusing on an object at a finite distance.
Figure 14:
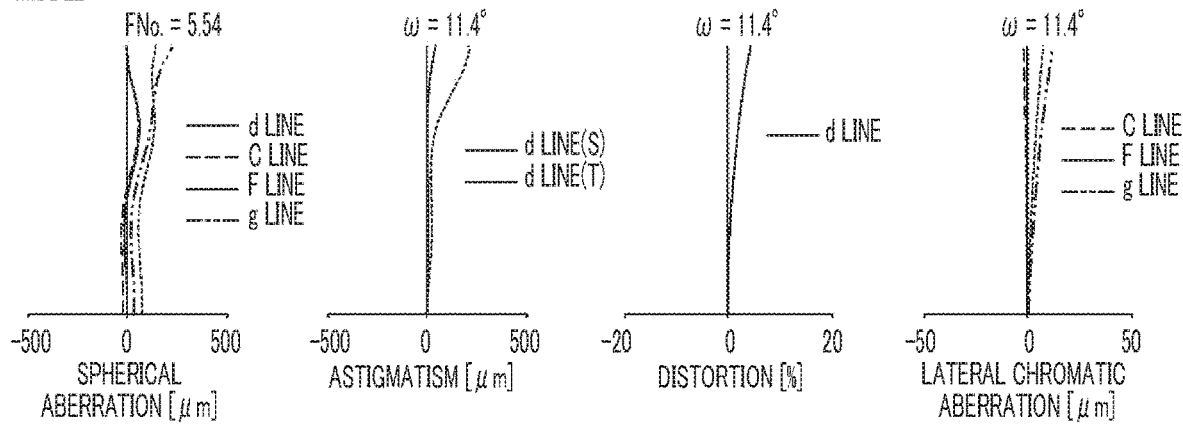
Figure 14:
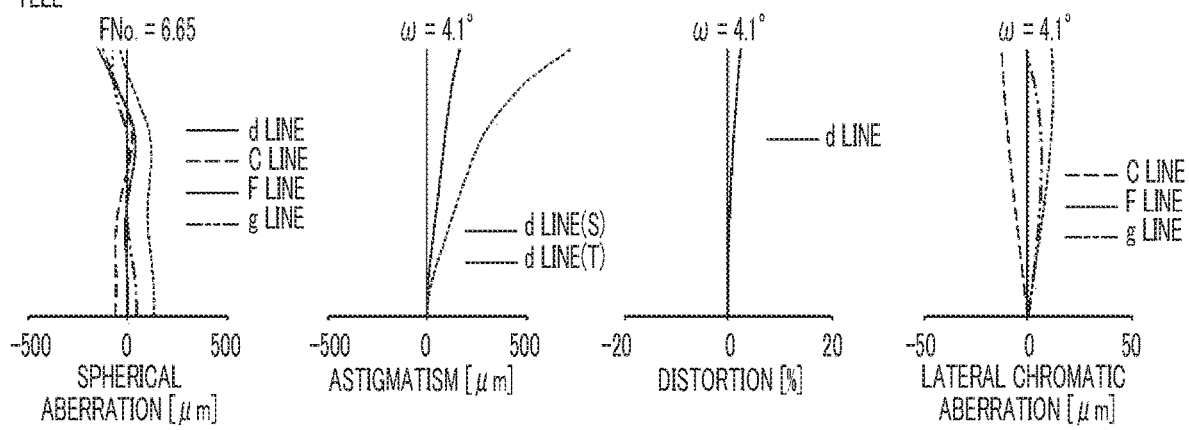

FIG. 5 is a cross-sectional view of a zoom lens of Example 4. The zoom lens of Example 4 has the same configuration as the outline of the zoom lens of Example 1. A lens L21 of Example 4 is a complex aspherical lens. Table 10 shows basic lens data of the zoom lens of Example 4, Table 11 shows specification and variable surface distances, and Table 12 shows aspherical surface coefficients. FIG. 13 shows aberration diagrams in a state where the object at infinity is in focus, and FIG. 14 shows aberration diagrams in a state where the object at a distance of 1.5 meters (m) from the image plane Sim is in focus.

TABLE 10

Example 4

| Sn | R | D | Nd | vd | θgF |
|---|---|---|---|---|---|
| 1 | 84.75133 | 1.500 | 1.73800 | 32.33 | 0.59005 |
| 2 | 52.84624 | 7.075 | 1.49700 | 81.61 | 0.53887 |
| 3 | 958.80303 | 0.150 | | | |
| 4 | 54.96431 | 5.179 | 1.49700 | 81.61 | 0.53887 |
| 5 | 227.11481 | DD[5] | | | |
| *6 | 75.17995 | 0.200 | 1.51876 | 54.04 | 0.55938 |
| 7 | 59.06751 | 1.400 | 1.83400 | 37.21 | 0.58082 |
| 8 | 13.71704 | 7.788 | | | |
| 9 | -22.12760 | 0.710 | 1.51742 | 52.43 | 0.55649 |
| 10 | 21.83549 | 4.497 | 1.84666 | 23.78 | 0.62054 |
| 11 | -60.71171 | 1.601 | | | |
| 12 | -20.32028 | 0.700 | 1.83481 | 42.74 | 0.56490 |
| 13 | -44.87909 | DD[13] | | | |
| 14(St) | ∞ | 0.800 | | | |

TABLE 10-continued

Example 4

| Sn | R | D | Nd | vd | θgF |
|---|---|---|---|---|---|
| *15 | 18.16669 | 3.000 | 1.68948 | 31.02 | 0.59874 |
| *16 | 170.88517 | 0.150 | | | |
| 17 | 20.03989 | 4.685 | 1.48749 | 70.24 | 0.53007 |
| 18 | -25.36075 | 0.150 | | | |
| 19 | -71.95304 | 0.600 | 1.85025 | 30.05 | 0.59797 |
| 20 | 10.95195 | 3.189 | 1.48749 | 70.24 | 0.53007 |
| 21 | 21.95796 | 2.000 | | | |
| *22 | 15.75973 | 5.140 | 1.49700 | 81.61 | 0.53887 |
| *23 | -22.63864 | DD[23] | | | |
| 24 | 66.44848 | 2.260 | 1.80809 | 22.76 | 0.63073 |
| 25 | -47.06499 | 0.600 | 1.83481 | 42.74 | 0.56490 |
| 26 | 17.10792 | DD[26] | | | |
| *27 | -57.72176 | 1.000 | 1.53409 | 55.87 | 0.55858 |
| *28 | -366.83956 | DD[28] | | | |
| 29 | -113.50432 | 3.597 | 1.48749 | 70.24 | 0.53007 |
| 30 | -29.29827 | DD[30] | | | |
| 31 | ∞ | 2.850 | 1.54763 | 54.99 | 0.55229 |
| 32 | ∞ | 1.000 | | | |

TABLE 11

Example 4

| | WIDE | MIDDLE | TELE |
|---|---|---|---|
| Zr | 1.0 | 3.7 | 10.5 |
| f | 18.562 | 68.444 | 194.405 |
| FNo. | 3.61 | 5.53 | 6.51 |
| 2ω(°) | 79.6 | 22.8 | 8.4 |
| DD[5] | 0.800 | 26.019 | 55.209 |
| DD[13] | 23.482 | 4.156 | 1.406 |
| DD[23] | 1.429 | 8.474 | 2.459 |
| DD[26] | 3.445 | 10.757 | 11.964 |

TABLE 11-continued

Example 4

| | WIDE | MIDDLE | TELE |
|---|---|---|---|
| DD[28] | 1.560 | 9.159 | 21.872 |
| DD[30] | 19.547 | 17.578 | 28.771 |

TABLE 12

Example 4

| Sn | 6 | 15 | 16 | |
|---|---|---|---|---|
| KA | 1.0000000E+00 | 1.0000000E+00 | 1.0000000E+00 | |
| A3 | 1.4872458E-20 | -1.5791748E-19 | 7.8958738E-20 | |
| A4 | 1.4293606E-05 | 2.6289170E-05 | 6.8586051E-05 | |
| A5 | -7.6243133E-08 | -2.7829674E-06 | -3.6000591E-06 | |
| A6 | -4.2898093E-08 | 5.1250899E-08 | 5.3894761E-07 | |
| A7 | 3.5373115E-09 | 1.1726524E-07 | 6.9479853E-08 | |
| A8 | -1.4330250E-10 | -8.7067361E-09 | -6.9900114E-09 | |
| A9 | -3.4679000E-12 | -4.8315943E-10 | -2.8763740E-10 | |
| A10 | 4.9657578E-13 | 4.0422146E-11 | 2.3285042E-11 | |

| Sn | 22 | 23 | 27 | 28 |
|---|---|---|---|---|
| KA | 1.0000000E+00 | 1.0000000E+00 | 1.0000000E+00 | 1.0000000E+00 |
| A3 | -5.9219054E-20 | -3.9479369E-20 | -4.3368087E-20 | 0.0000000E+00 |
| A4 | -6.9532205E-05 | 8.9556622E-06 | -1.2945188E-04 | -1.1219871E-04 |
| A5 | 6.8042964E-06 | 8.7459941E-06 | 1.0229474E-05 | 6.5487738E-06 |
| A6 | -5.7873869E-07 | -8.8567872E-07 | 1.6185768E-06 | 1.8009706E-06 |
| A7 | -2.7316586E-08 | -1.8628087E-08 | -1.9338886E-07 | -1.9588467E-07 |
| A8 | 8.3795341E-09 | 9.7387874E-09 | -1.2599121E-08 | -1.1267627E-08 |
| A9 | -1.0053801E-10 | -3.3602579E-10 | 7.6038947E-10 | 1.0637196E-09 |
| A10 | -4.1478234E-11 | -6.3837227E-12 | 2.8909648E-11 | 2.8061860E-12 |
| A11 | 7.0783164E-13 | 1.8603707E-12 | | |
| A12 | 7.4114490E-14 | -1.1884796E-13 | | |

Example 5

Figure 6:
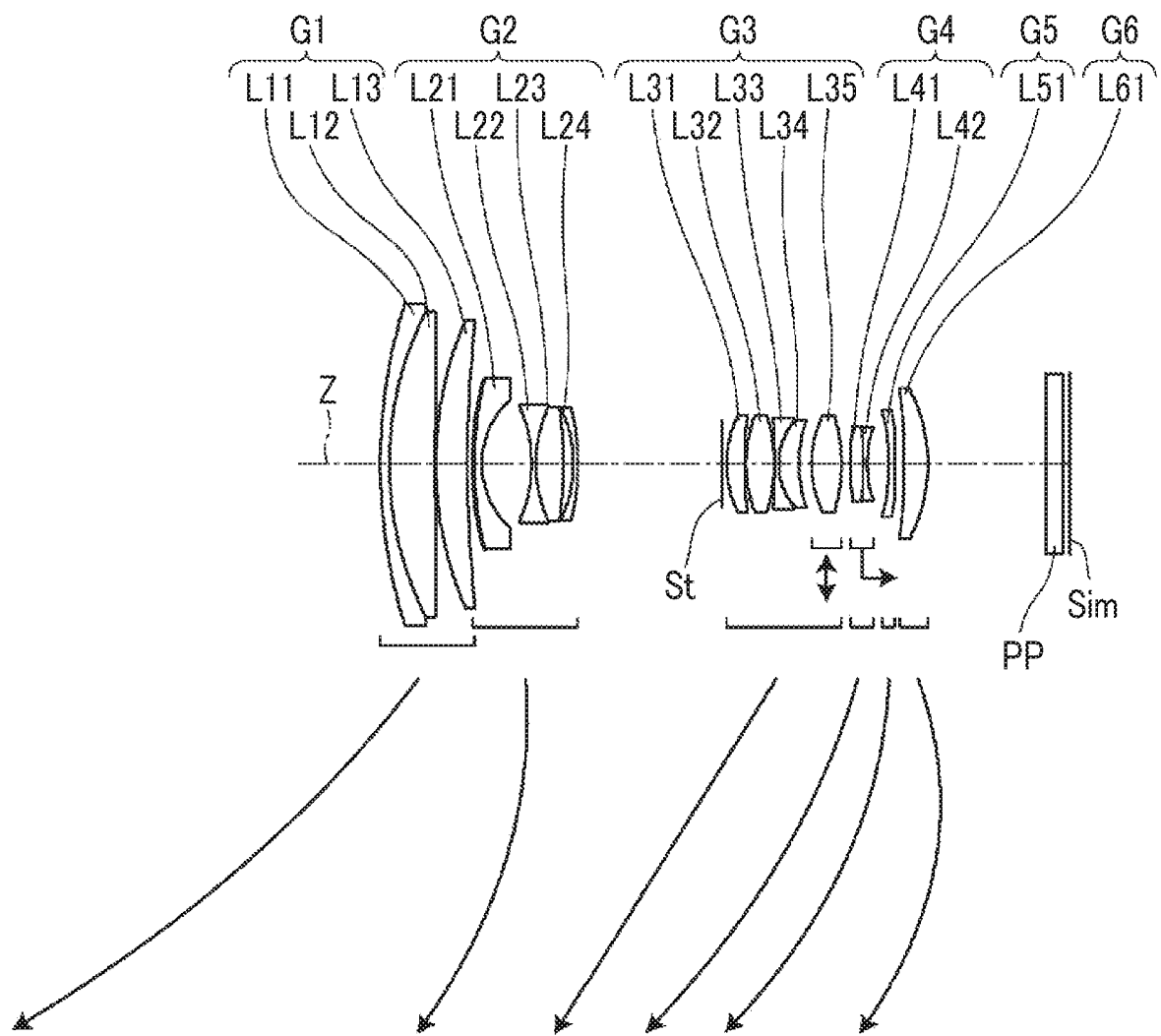
FIG. 6 is a cross-sectional view illustrating a lens configuration and a movement locus of a zoom lens according to Example 5 of the present invention at the wide-angle end.
Figure 15:
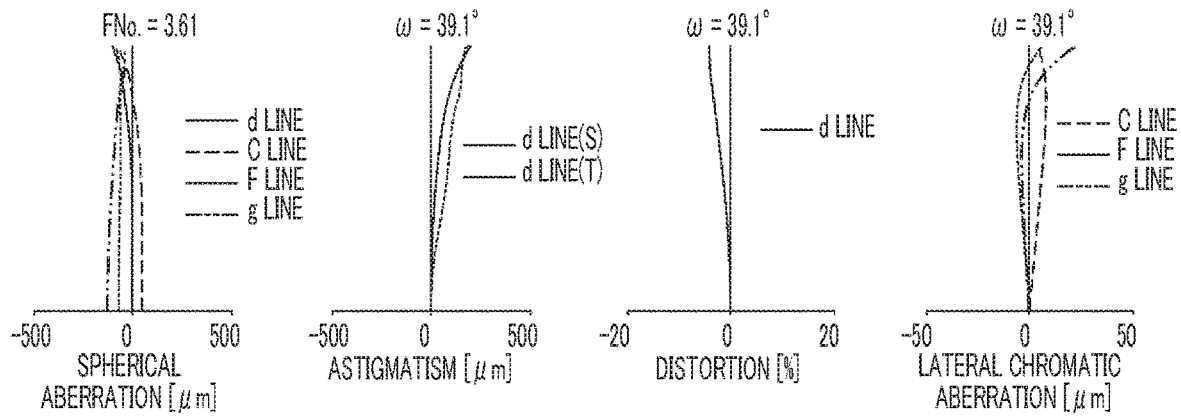
FIG. 15 is a diagram of aberrations of the zoom lens according to Example 5 of the present invention during focusing on an object at infinity.
Figure 15:
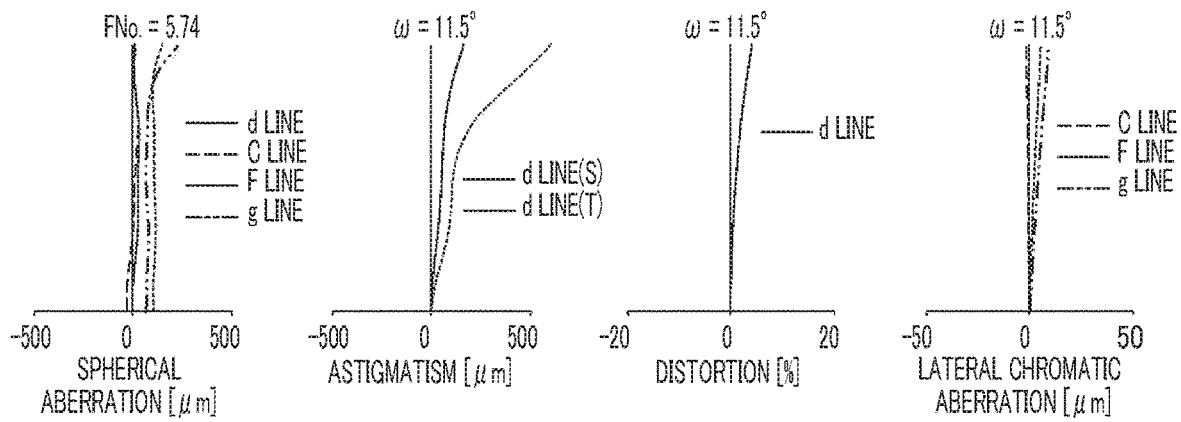
Figure 15:
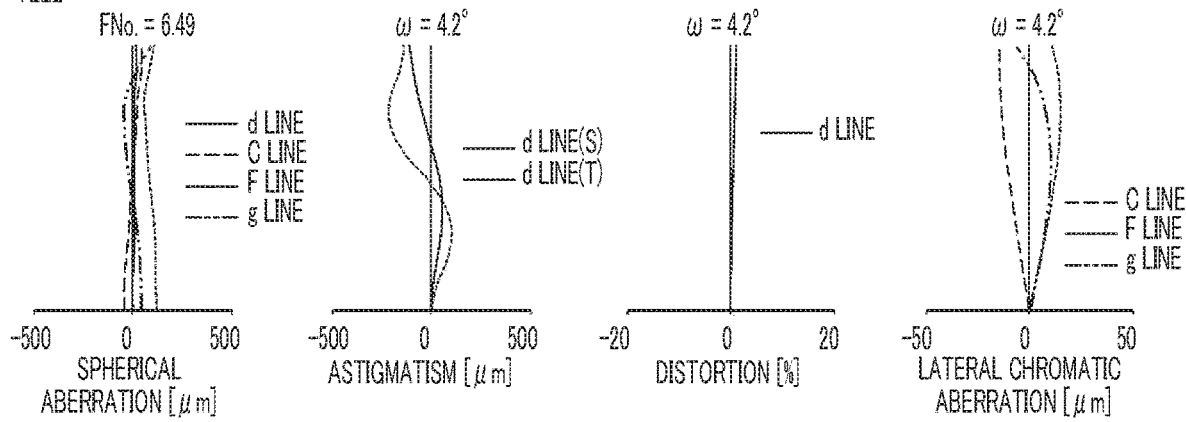
Figure 16:
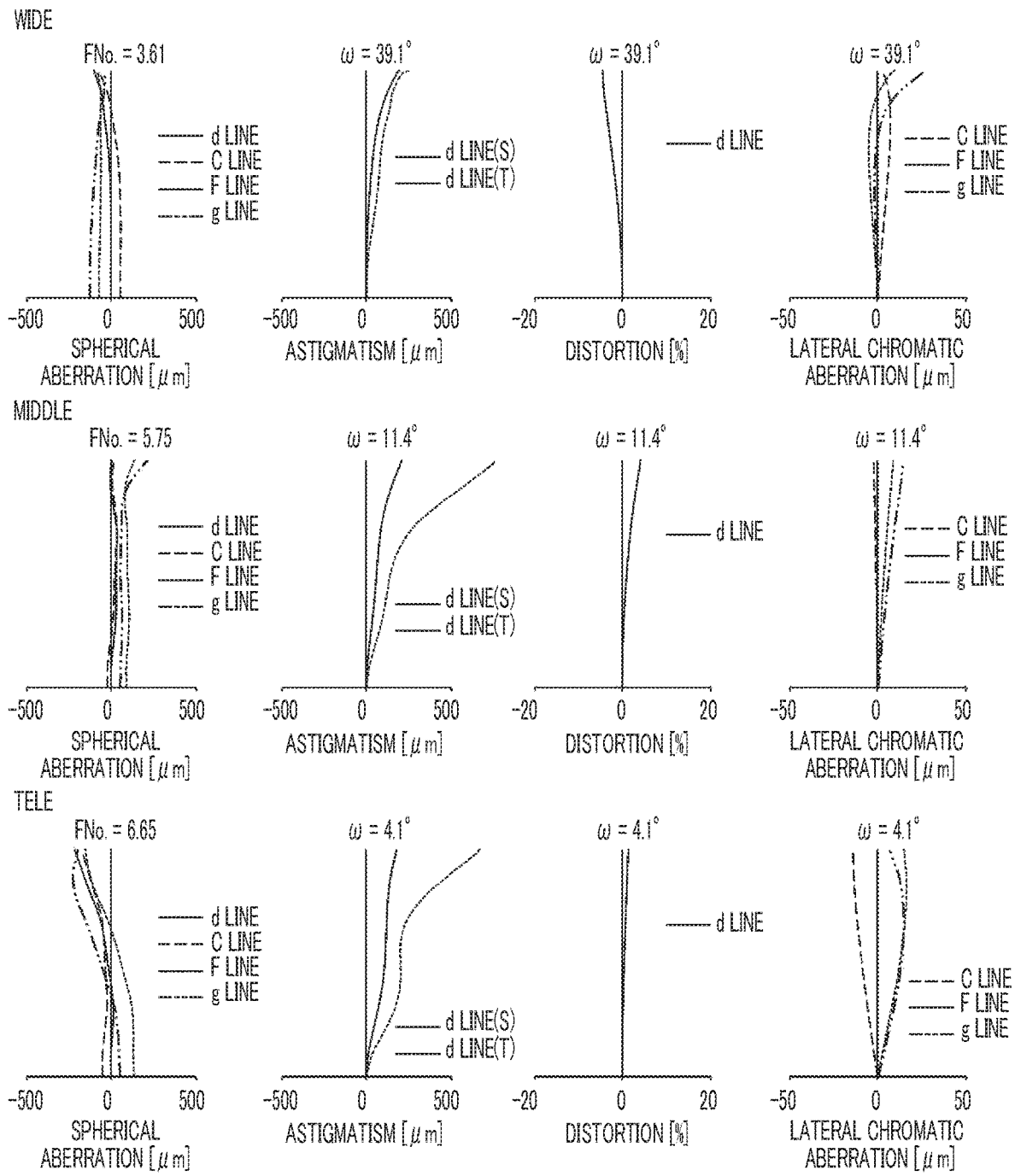
FIG. 16 is a diagram of aberrations of the zoom lens according to Example 5 of the present invention during focusing on an object at a finite distance.

FIG. 6 is a cross-sectional view of a zoom lens of Example 5. The zoom lens of Example 5 has the same configuration as the outline of the zoom lens of Example 1. A lens L21 of Example 5 is a complex aspherical lens. Table 13 shows basic lens data of the zoom lens of Example 5, Table 14 shows specification and variable surface distances, and Table 15 shows aspherical surface coefficients. FIG. 15 shows aberration diagrams in a state where the object at infinity is in focus, and FIG. 16 shows aberration diagrams in a state where the object at a distance of 1.5 meters (m) from the image plane Sim is in focus.

TABLE 13

Example 5

| Sn | R | D | Nd | vd | θgF |
|---|---|---|---|---|---|
| 1 | 84.71081 | 1.500 | 1.73800 | 32.33 | 0.59005 |
| 2 | 53.55987 | 7.418 | 1.49700 | 81.61 | 0.53887 |
| 3 | 1450.19213 | 0.150 | | | |
| 4 | 57.75495 | 5.173 | 1.49700 | 81.61 | 0.53887 |
| 5 | 220.51162 | DD[5] | | | |
| *6 | 66.03826 | 0.300 | 1.51876 | 54.04 | 0.55938 |
| 7 | 56.39697 | 1.200 | 1.83400 | 37.21 | 0.58082 |
| 8 | 13.47361 | 8.109 | | | |
| 9 | -21.76017 | 0.710 | 1.51742 | 52.43 | 0.55649 |
| 10 | 21.70418 | 4.382 | 1.84666 | 23.78 | 0.62054 |
| 11 | -70.75984 | 1.698 | | | |
| 12 | -20.07004 | 0.700 | 1.83481 | 42.74 | 0.56490 |
| 13 | -38.17740 | DD[13] | | | |
| 14(St) | ∞ | 0.800 | | | |
| *15 | 17.29640 | 3.000 | 1.68948 | 31.02 | 0.59874 |

TABLE 13-continued

Example 5

| Sn | R | D | Nd | vd | θgF |
|---|---|---|---|---|---|
| *16 | 166.67583 | 0.150 | | | |
| 17 | 20.98487 | 4.591 | 1.48749 | 70.24 | 0.53007 |
| 18 | -25.06299 | 0.150 | | | |
| 19 | -81.19765 | 0.600 | 1.85025 | 30.05 | 0.59797 |
| 20 | 10.48395 | 3.308 | 1.48749 | 70.24 | 0.53007 |
| 21 | 21.62271 | 2.000 | | | |
| *22 | 15.86412 | 4.901 | 1.49700 | 81.61 | 0.53887 |
| *23 | -23.67940 | DD[23] | | | |
| 24 | 53.83432 | 2.047 | 1.80809 | 22.76 | 0.63073 |
| 25 | -68.74251 | 0.600 | 1.83481 | 42.74 | 0.56490 |
| 26 | 16.15453 | DD[26] | | | |
| *27 | -57.53685 | 1.000 | 1.53409 | 55.87 | 0.55858 |
| *28 | -2502.20531 | DD[28] | | | |
| 29 | -87.97978 | 3.832 | 1.48749 | 70.24 | 0.53007 |
| 30 | -25.34770 | DD[30] | | | |
| 31 | ∞ | 2.850 | 1.54763 | 54.99 | 0.55229 |
| 32 | ∞ | 1.000 | | | |

TABLE 14

Example 5

| | WIDE | MIDDLE | TELE |
|---|---|---|---|
| Zr | 1.0 | 3.7 | 10.5 |
| f | 18.558 | 68.429 | 194.361 |
| FNo. | 3.61 | 5.74 | 6.49 |
| 2ω (°) | 78.2 | 23.0 | 8.4 |
| DD[5] | 0.800 | 24.719 | 57.136 |
| DD[13] | 23.274 | 3.764 | 1.426 |
| DD[23] | 1.471 | 8.416 | 1.809 |

TABLE 14-continued

Example 5

| | WIDE | MIDDLE | TELE |
|---|---|---|---|
| DD[26] | 3.533 | 10.983 | 17.232 |
| DD[28] | 1.563 | 8.603 | 15.094 |
| DD[30] | 19.216 | 20.370 | 30.324 |

TABLE 15

Example 5

| Sn | 6 | 15 | 16 | |
|---|---|---|---|---|
| KA | 1.0000000E+00 | 1.0000000E+00 | 1.0000000E+00 | |
| A3 | −2.4276014E-20 | −4.3368087E-20 | 0.0000000E+00 | |
| A4 | 1.5475841E-05 | 2.0837324E-05 | 6.8845365E-05 | |
| A5 | −3.3812045E-07 | −1.9902782E-06 | −3.6824306E-06 | |
| A6 | −2.0599396E-08 | −2.8749911E-07 | 3.6192735E-07 | |
| A7 | 5.6685427E-09 | 1.3036548E-07 | 8.8192414E-08 | |
| A8 | −4.4293362E-10 | −5.8373906E-09 | −7.5020753E-09 | |
| A9 | 3.6537360E-12 | −7.3377011E-10 | −5.1711433E-10 | |
| A10 | 6.0644102E-13 | 1.2198849E-11 | 8.0889195E-12 | |

| Sn | 22 | 23 | 27 | 28 |
|---|---|---|---|---|
| KA | 1.0000000E+00 | 1.0000000E+00 | 1.0000000E+00 | 1.0000000E+00 |
| A3 | 1.3877788E-18 | 1.3877788E-18 | 0.0000000E+00 | 0.0000000E+00 |
| A4 | −4.0743079E-05 | 3.1529520E-05 | −2.3107642E-04 | −2.1034145E-04 |
| A5 | −1.6352409E-05 | −7.8595749E-06 | 2.1633360E-05 | 1.7578744E-05 |
| A6 | 9.9720128E-06 | 5.8233200E-06 | 2.3121322E-06 | 2.2445862E-06 |
| A7 | −2.6703164E-06 | −1.7176068E-06 | −4.6603486E-07 | −4.0212625E-07 |
| A8 | 3.8909131E-07 | 2.7120790E-07 | −5.4648501E-09 | −6.1941686E-09 |
| A9 | −3.0321710E-08 | −2.2614184E-08 | 2.1319079E-09 | 2.2341188E-09 |
| A10 | 9.8325654E-10 | 7.8431226E-10 | −1.9106189E-11 | −4.3519710E-11 |

Table 16 shows values corresponding to Conditional Expressions (1) to (6) of the zoom lenses of Examples 1 to 5. In Examples 1 to 5, the d line is set as the reference wavelength. Table 16 shows the values on the d line basis.

TABLE 16

| Expression Number | | Example 1 | Example 2 | Example 3 | Example 4 | Example 5 |
|---|---|---|---|---|---|---|
| (1) | (XT1-XW1)/(XT2-XW2) | 3.90 | 3.73 | 3.78 | 4.20 | 4.35 |
| (2) | D56W/D56T | 0.08 | 0.08 | 0.07 | 0.07 | 0.10 |
| (3) | D45W/D45T | 0.29 | 0.29 | 0.29 | 0.29 | 0.21 |
| (4) | f3r/f3 | 0.28 | 0.32 | 0.28 | 0.24 | 0.28 |
| (5) | D34W/D34T | 0.41 | 0.67 | 0.60 | 0.58 | 0.81 |
| (6) | v3f | 40.51 | 34.71 | 31.02 | 31.02 | 31.02 |

As can be seen from the above data, in the zoom lens of Examples 1 to 5, the high zoom ratio is ensured such that the zoom ratio is equal to or greater than 10, reduction in size is achieved, and various aberrations are satisfactorily corrected with regard to imaging over the entire zooming range and from distant view to near view. Accordingly, high optical performance is achieved.

Figure 17:
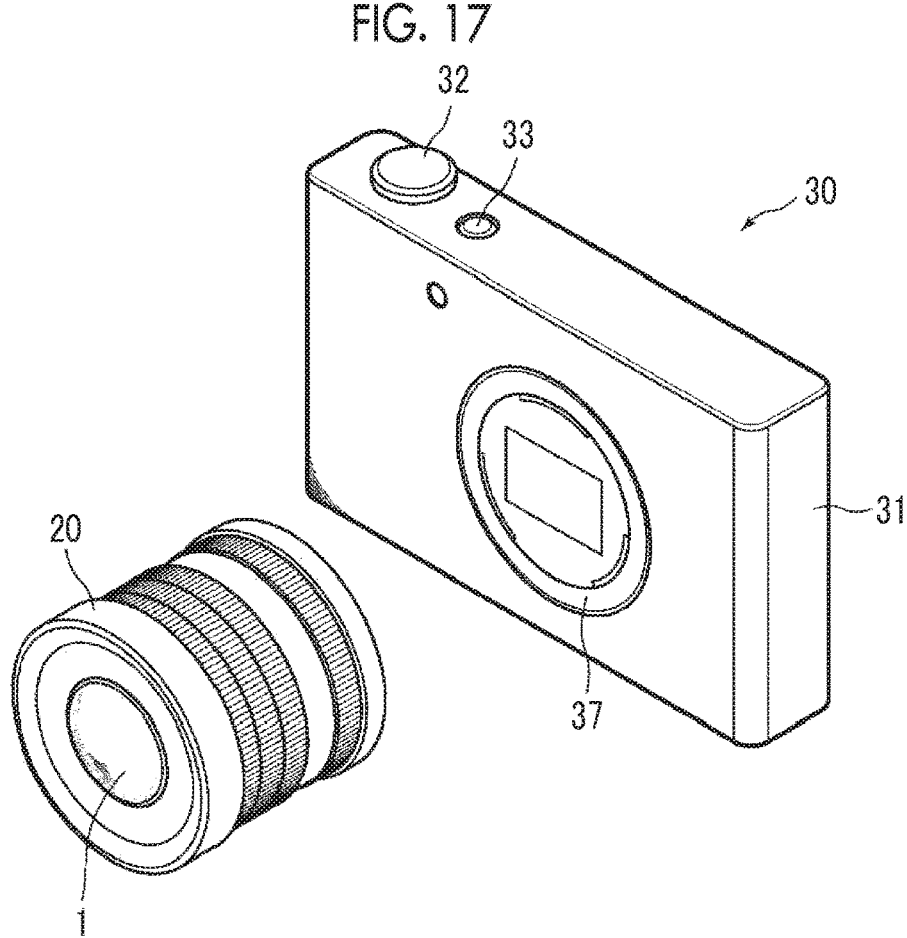
FIG. 17 is a perspective view of an imaging apparatus according to the embodiment of the present invention when viewed from a front side.
Figure 18:
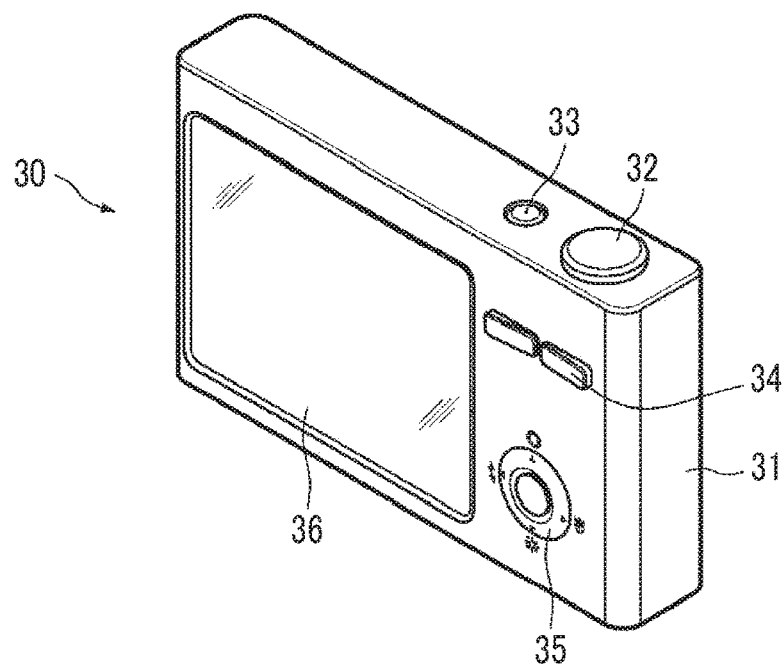
FIG. 18 is a perspective view of an imaging apparatus according to the embodiment of the present invention when viewed from a rear side.

Next, an imaging apparatus according to an embodiment of the present invention will be described. FIGS. 17 and 18 are external views of a camera 30 which is the imaging apparatus according to the embodiment of the present invention. FIG. 17 is a perspective view in a case where the camera 30 is viewed from the front side, and FIG. 18 is a perspective view in a case where the camera 30 is viewed from the rear side. The camera 30 is a mirrorless digital camera to which an interchangeable lens 20 is detachably attached. The interchangeable lens 20 includes the zoom lens 1 according to the embodiment of the present invention which is accommodated in a lens barrel.

The camera 30 comprises a camera body 31, and a shutter button 32 and a power button 33 are provided on the upper surface of the camera body 31. A manipulation unit 34, a manipulation unit 35, and a display unit 36 are provided on the rear surface of the camera body 31. The display unit 36 displays a captured image and an image within an angle of view before the image is captured.

An imaging opening on which rays from an imaging target are incident is formed in the central portion of the front surface of the camera body 31, a mount 37 is provided in a position corresponding to the imaging opening, and the interchangeable lens 20 is attached to the camera body 31 through the mount 37.

An imaging element such as a charge coupled device (CCD) or a complementary metal oxide semiconductor (CMOS) that outputs imaging signals corresponding to a subject image formed by the interchangeable lens 20, a signal processing circuit that generates an image by processing the imaging signals output from the imaging element, and a recording medium for recording the generated image are provided within the camera body 31. In the camera 30, it is possible to image a still image or a motion picture by pressing the shutter button 32, and image data obtained through the imaging is recorded in the recording medium.

The present invention has been hitherto described through embodiments and examples, but the present invention is not limited to the above-mentioned embodiments and examples, and may be modified into various forms. For example, values such as the radius of curvature, the surface distance, the refractive index, the Abbe number, and the aspherical surface coefficient of each lens are not limited to the values shown in the numerical examples, and different values may be used therefor.

The imaging apparatus according to the embodiment of the present invention is not limited to the examples. For example, various aspects such as cameras other than nonreflex cameras, film cameras, video cameras, movie shooting cameras, and broadcasting cameras may be used.

What is claimed is:

1. A zoom lens comprising:
   only six lens groups, as lens groups, which consist of a first lens group having a positive refractive power, a second lens group having a negative refractive power, a third lens group having a positive refractive power, a fourth lens group having a negative refractive power, a fifth lens group having a negative refractive power, and a sixth lens group having a positive refractive power, in order from an object side to an image side,
   wherein all distances between adjacent lens groups in an optical axis direction change during zooming,
   a stop is disposed between a lens surface of the second lens group closest to the image side and a lens surface of the fourth lens group closest to the image side,
   the first lens group consists of a negative lens, a positive lens, and a positive lens in order from the object side to the image side,
   a lens group moving during focusing is only the fourth lens group, and the fourth lens group moves to the image side during focusing from an object with a long range to an object with a short range, and
   wherein a lens of the third lens group closest to the image side is a positive lens, and
   assuming that a focal length of the positive lens of the third lens group closest to the image side is f3r, and a focal length of the third lens group is f3, Conditional Expression (4) is satisfied, $$0.16 < f3r/f3 < 0.4 \qquad (4).$$

2. The zoom lens according to claim 1,
   wherein Conditional Expression (4-1) is satisfied, $$0.2 < f3r/f3 < 0.36 \qquad (4\text{-}1).$$

3. The zoom lens according to claim 1,
   wherein all the six lens groups move in an optical axis direction during zooming.

4. The zoom lens according to claim 1,
   wherein assuming that a distance on the optical axis between a lens surface of the fifth lens group closest to the image side and a lens surface of the sixth lens group closest to the object side at the wide-angle end is D56W and a distance on the optical axis between a lens surface of the fifth lens group closest to the image side and a lens surface of the sixth lens group closest to the object side at the telephoto end is D56T, Conditional Expression (2) is satisfied, $$0.03 < D56W/D56T < 0.2 \qquad (2).$$

5. The zoom lens according to claim 1,
   wherein assuming that a distance on the optical axis between a lens surface of the fourth lens group closest to the image side and a lens surface of the fifth lens group closest to the object side at the wide-angle end is D45W and a distance on the optical axis between a lens surface of the fourth lens group closest to the image side and a lens surface of the fifth lens group closest to the object side at the telephoto end is D45T, Conditional Expression (3) is satisfied, $$0.11 < D45W/D45T < 0.4 \qquad (3).$$

6. The zoom lens according to claim 1,
   wherein assuming that a distance on the optical axis between a lens surface of the third lens group closest to the image side and a lens surface of the fourth lens group closest to the object side at the wide-angle end is D34W and a distance on the optical axis between a lens surface of the third lens group closest to the image side and a lens surface of the fourth lens group closest to the object side at the telephoto end is D34T, Conditional Expression (5) is satisfied, $$0.2 < D34W/D34T < 1.2 \qquad (5).$$

7. The zoom lens according to claim 1,
   wherein a lens of the third lens group closest to the object side is a positive lens, and
   assuming that an Abbe number of the positive lens of the third lens group closest to the object side at a d line is v3f, Conditional Expression (6) is satisfied, $$25 < v3f < 49 \qquad (6).$$

8. The zoom lens according to claim 1,
   wherein a lens of the third lens group closest to the image side is a positive lens, and
   image shake correction is performed by moving the positive lens of the third lens group closest to the image side in a direction crossing the optical axis.

9. The zoom lens according to claim 1,
   wherein all lens surfaces of the sixth lens group have shapes convex toward the image side.

10. The zoom lens according to claim 1,
    wherein the third lens group consists of a single lens having a positive refractive power, a single lens having a positive refractive power, a cemented lens obtained by cementing a negative lens and a positive lens in order from the object side, and a single lens having a positive refractive power in order from the object side to the image side.

11. The zoom lens according to claim 1,
    wherein the fourth lens group consists of a cemented lens obtained by cementing a positive lens and a negative lens in order from the object side.

12. The zoom lens according to claim 1,
    wherein the fifth lens group consists of a single lens having a negative refractive power.

13. The zoom lens according to claim 1,
    wherein the sixth lens group consists of a single lens having a positive refractive power.

14. The zoom lens according to claim 4,
    wherein Conditional Expression (2-1) is satisfied, $$0.05 < D56W/D56T < 0.15 \qquad (2\text{-}1).$$

15. The zoom lens according to claim 5,
    wherein Conditional Expression (3-1) is satisfied, $$0.16 < D45W/D45T < 0.35 \qquad (3\text{-}1).$$

16. The zoom lens according to claim 6,
    wherein Conditional Expression (5-1) is satisfied, $$0.3 < D34W/D34T < 1 \qquad (5\text{-}1).$$

17. The zoom lens according to claim 7,
    wherein Conditional Expression (6-1) is satisfied, $$28 < v3f < 45 \qquad (6\text{-}1).$$

18. An imaging apparatus comprising the zoom lens according to claim 1.

* * * * *